United States Patent
Kikuchi et al.

(10) Patent No.: US 7,588,858 B2
(45) Date of Patent: Sep. 15, 2009

(54) BATTERY, METHOD OF MANUFACTURING THE SAME, METHOD OF MANUFACTURING WELDMENT, AND PEDESTAL

(75) Inventors: Kiyoshi Kikuchi, Fukushima (JP); Koichi Fukata, Fukushima (JP); Bunya Sato, Fukushima (JP); Shuji Sasaki, Fukushima (JP); Chiaki Anzai, Fukushima (JP); Hiroshi Anzai, Fukushima (JP)

(73) Assignee: Sony Corporation, Tokyo (JP)

( * ) Notice: Subject to any disclaimer, the term of this patent is extended or adjusted under 35 U.S.C. 154(b) by 75 days.

(21) Appl. No.: 11/338,018

(22) Filed: Jan. 24, 2006

(65) Prior Publication Data

US 2006/0159987 A1 Jul. 20, 2006

Related U.S. Application Data

(62) Division of application No. 10/169,393, filed as application No. PCT/JP01/09572 on Oct. 31, 2001, now Pat. No. 7,037,621.

(30) Foreign Application Priority Data

Nov. 1, 2000 (JP) ............................ P2000-335187
Nov. 1, 2000 (JP) ............................ P2000-373559

(51) Int. Cl.
*H01M 2/02* (2006.01)
*H01M 4/02* (2006.01)
*B23K 11/00* (2006.01)
*B23K 9/28* (2006.01)
*B23K 11/10* (2006.01)

(52) U.S. Cl. .................... 429/178; 429/211; 219/78.01; 219/86.9; 219/91.2; 219/118

(58) Field of Classification Search ................. 429/178, 429/211; 219/78.01, 86.1, 86.9, 91.2, 117.1, 219/118
See application file for complete search history.

(56) References Cited

U.S. PATENT DOCUMENTS

| 1,568,080 A | 1/1926 | Meadowcroft |
|---|---|---|
| 1,664,030 A | 3/1928 | Gravel |
| 2,554,335 A | 3/1951 | Linnert |

(Continued)

FOREIGN PATENT DOCUMENTS

DE 3938525 11/1989

(Continued)

*Primary Examiner*—Patrick Ryan
*Assistant Examiner*—Thomas H. Parsons
(74) *Attorney, Agent, or Firm*—Sonnenschein Nath & Rosenthal LLP

(57) ABSTRACT

A metal plate and an electrode in a polymer lithium ion secondary battery or the like are welded certainly, and it is accomplished to further improve the reliability and the durability thereof. Each of an upper metal plate (7a) and a lower metal plate (9a) on the positive pole/terminal is welded to a pole/terminal of positive electrode (3) so that the pole/terminal of positive electrode (3) may be sandwiched from each of the upper and lower sides. Moreover, each of an upper metal plate (7b) and a lower metal plate (9b) on the negative pole/terminal is welded to a pole/terminal of negative electrode (5) so that the pole/terminal of negative electrode (5) may be sandwiched from each of the upper and lower sides. This eliminates occurrence of poor welding in the electric resistance welding.

15 Claims, 37 Drawing Sheets

U.S. PATENT DOCUMENTS

| | | |
|---|---|---|
| 4,343,982 A | 8/1982 | Schwartz et al. |
| 4,904,839 A | 2/1990 | Tan et al. |
| 5,667,915 A | 9/1997 | Loustau et al. |
| 5,796,588 A | 8/1998 | Machida et al. |
| 5,976,729 A | 11/1999 | Morishita et al. |
| 5,981,107 A * | 11/1999 | Hamano et al. ........ 429/231.95 |
| 6,024,773 A | 2/2000 | Inuzuka et al. |
| 6,037,559 A | 3/2000 | Okabe et al. |
| 6,051,342 A | 4/2000 | Hamano et al. |
| 6,117,589 A | 9/2000 | Satou et al. |
| 6,124,061 A | 9/2000 | Hamano et al. |
| 6,136,471 A | 10/2000 | Yoshida et al. |

FOREIGN PATENT DOCUMENTS

| | | | |
|---|---|---|---|
| EP | 0548449 | | 6/1993 |
| FR | 2605457 | | 10/1986 |
| JP | 55 154063 | | 12/1980 |
| JP | 60 227998 | | 11/1985 |
| JP | 60 231597 | | 11/1985 |
| JP | 02 274383 | | 11/1990 |
| JP | 06 007957 | | 1/1994 |
| JP | 07 328774 | | 12/1995 |
| JP | 08 306392 | | 11/1996 |
| JP | 09 085454 | | 3/1997 |
| JP | 09 265973 | | 10/1997 |
| JP | 10 146679 | | 6/1998 |
| JP | 10146679 | * | 6/1998 |
| JP | 11 054110 | | 2/1999 |
| JP | 11 077347 | | 3/1999 |
| JP | 11 226748 | | 8/1999 |
| WO | WO 97/10920 | | 3/1997 |

* cited by examiner

BATTERY, METHOD OF MANUFACTURING THE SAME, METHOD OF MANUFACTURING WELDMENT, AND PEDESTAL

CROSS REFERENCE TO RELATED APPLICATIONS

This is a divisional application of U.S. patent application Ser. No. 10/169,393, filed Nov. 12, 2002, now U.S. Pat. No. 7,037,621, which is a national stage application of PCT/JP01/09572, filed Oct. 31, 2001, which claims priority to JP 2000-335187, filed Nov. 1, 2000, and JP 2000-373559, filed Nov. 1, 2000, each of which is incorporated herein by reference to the extent permitted by law in its entirety.

TECHNICAL FIELD

The present invention relates to a battery having a structure with a metal plate welded to an electrode, a method of manufacturing the same comprising the welding step, a method of manufacturing weldment, and pedestal.

BACKGROUND OF THE INVENTION

Lithium ion secondary batteries have been used in recent years as a power supply with ability of charge and discharge of electricity which is incorporated in cellular phones or portable electric devices. Moreover, for example, batteries using a solid-like unfluidized electrolyte as the electrolyte without danger of liquid leakage are also known. There are various outside forms of such a lithium ion secondary battery, and the batteries, generally used for notebook type or pocketbook type portable electric devices and cellular phones, are flat type in many cases. In such a flat type lithium ion secondary battery, in order to produce electric current continuity between a main body of a secondary battery cell and the exterior, board-like electrodes are respectively located on the positive pole/terminal and the negative pole/terminal.

The pole/terminal of positive electrode is generally formed with thin aluminum or an aluminum base alloy having a thickness of about 0.07-0.1 mm by the press cut or the like, in order to satisfy the structural limitations in a part connected to the main body of the secondary battery cell, restrain and reduce the thickness of the whole secondary battery, and ensure high conductivity, and a metal plate (the so-called tab) further connected with the exterior terminal lead is welded to the tip portion in many cases. As the metal plate, materials with low electric resistance, excellent mechanical strength, and excellent weather resistance such as a nickel base alloy are used suitably in order to electrically and mechanically (based on strength of material) ensure the connection with the exterior. Moreover, the plate thickness is set, for example, to 0.1 mm or more in many cases.

The metal plate and the electrode are generally welded by the electric resistance welding or the ultrasonic welding, and the sure welding is strongly needed so that the metal plate may not be separated nor omitted from the electrode, while using the secondary battery or the like.

However, there is a problem that poor welding occurs in the case of the electric resistance welding between the above electrode and the metal plate.

The first reason for the difficulty of the electric resistance welding is the difference between aluminum and nickel melting points. That is, the pole/terminal of positive electrode is formed with aluminum or the aluminum base alloy, so the melting point is 660-700° C. On the other hand, the metal plate is formed with the material with both high mechanical strength and a comparatively high melting point, so the melting point is, for example, 1400-1455° C. in the case of the nickel base alloy. Therefore, the difference between the electrode and the metal plate melting points reaches about 800° C. Moreover, the boiling point of aluminum is 2486° C., the boiling point of nickel is 2731° C., and the boiling points also differ greatly.

The second reason for the difficulty of the electric resistance welding is the existence of an oxide film (aluminum oxide) formed on the surface of the aluminum plate. The melting point of aluminum oxide is as high as 2050° C., and in the case of the electric resistance welding between the aluminum plate and the nickel plate, it is necessary to dissolve the thin oxide film under the temperature of the weld part of about 2050° C. or higher. Here, the aluminum oxide film on the aluminum surface is generally called alumina, and the chemical formula thereof is $Al_2O_3$.

Thus, if a welding condition is set up so that the welding temperature may reach the melting point or more of the metal plate made of the nickel base alloy or the like, in the case of welding a pile of one electrode and one metal plate by the conventional general electric resistance welding process, aluminum or the aluminum base alloy of the electrode dissolves completely over a large area to the extent that the plate thickness is penetrated exceeding the size of a normal/regular nugget. Accordingly, the dissolved metal is spilt out, aluminum evaporates and scatters around violently after the aluminum plate of the weld part reaches the boiling point, or the like phenomenon occurs, which causes generation of a hole in the part and poor welding without the sure welding.

Moreover, when the welding temperature is adjusted under the melting point of the metal plate, such as the nickel base alloy, in order to avoid such a complete broad dissolution of the electrode, the poor welding such as the hole generation in the electrode or the spill of the dissolved metal does not occur. However, since the nickel base alloy on the metal plate surface does not fuse, the normal nugget of both the nickel base alloy and the aluminum base alloy is not formed, only the trace of the aluminum base alloy melting is left on the cross section surface after the welding, and the poor welding of the unsure welding occurs. Consequently, for example, the peeling test reveals that the electrode and the metal plate separate easily under very lower power than the specific tensile proof stress.

Then, it is desired that various conditions of the electric resistance welding are set in order to generate a distribution of the welding temperature in which the normal nugget can be formed from the junction surface between the metal plate and the electrode to the peripheral part. However, such a condition setup unavoidably becomes very delicate, since the difference between the metal of the metal plate such as the nickel base alloy and metal of the electrode such as the aluminum base alloy melting points, is too large. Moreover, the tip of the electrode pole is degraded and deformed as the welding is continued, so it is very difficult to continuously maintain the setup of the above preferable delicate welding conditions in the actual mass production process, and therefore it is difficult to reduce the occurrence rate of the poor welding.

In addition, if the positive electrode terminal strip is composed of a nickel plate like the negative electrode terminal strip, the electric resistance welding can be carried out. However, if the nickel plate composes the positive electrode terminal strip, the nickel plate may react electrically in the inside of the battery and dissolve, and thus it is not preferable.

As described above, it is technically difficult to perform the electric resistance welding of the thin aluminum plate and the nickel plate, and particularly, the welding of the positive electrode terminal strip and a wiring board is conventionally performed by the ultrasonic welding.

However, there have been the following problems in the ultrasonic welding. First, the setting ranges of oscillating strength and amplitude time of the ultrasonic welding are small, and it is difficult to maintain the optimum conditions of the welding. Secondly, it is difficult to stabilize the welding strength, and the poor welding may occur at a certain rate in the mass production process for manufacturing the products in large quantities. Because, in the ultrasonic welding, only a very thin alloy layer is produced at the interface between the electrode and the metal plate, both are in the weakly connecting state only on the surface in many cases due to increasing the roughness of both the surfaces, and it is difficult to accomplish the demanded electrically and mechanically sure welding state for the welded surface. Moreover, the natural oxide film generated on the surface of the metal plate made of aluminum or the aluminum base alloy presents obstacles, and the weak welding action by the ultrasonic welding tends to be still weaker. And if the electrode and the metal plate are welded weakly as described above, the electric resistance becomes high in the part thereof, with such unfortunate consequences as the voltage which can be transferred from the secondary battery cell outside through the electrode and the metal plate decreases or the electric current can be limited.

Thirdly, ultrasonic welding devices are more expensive than resistance welding devices, and the equipment expenses for mass production becomes high. Fourthly, the ultrasonic welding devices are larger than the resistance welding devices, and a larger floor space is required. Then, developments in the technique for welding the thin aluminum plate and the nickel plate by the electric resistance welding have been demanded.

It is necessary, for example, to weld for long time using the supersonic wave with still stronger energy density or the like in order to produce the still stronger welding state by such ultrasonic welding. However, if the welding is performed with such strong supersonic wave for long time, the electrode, made of the aluminum base alloy with the thin thickness and the lower melting point, dissolves in the range exceeding the size required for welding like the case of the above electric resistance welding, and the advantages of the ultrasonic welding itself cannot be employed efficiently. For example, if too strong ultrasonic welding is performed, a part of the electrode made of the aluminum base alloy is cut.

Moreover, although the utilization of the soldering method is also considered as a method of electrically and mechanically fixing the metal plate to the electrode other than the welding, the natural oxide film (alumina) as described above is generated on the surface of the electrode made of the aluminum base alloy, and therefore presents obstacles to the wettability and attachment of the solder, and the soldering becomes difficult. It is thought that the treatment of pre-applying powerful flux or the like to the surface of the electrode for processing the natural oxide film of the surface before the soldering is effective to overcome the above obstacles. However, the inevitable result is that the component of such a strong flux remains on the electrode or the metal plate after soldering, so there are unfortunate consequences that the remaining component may remarkably degrade the durability of the connection part between the electrode and the metal plate. For example, the remaining components may gradually corrode the electrode during the period of using the secondary battery, which would eventually be damaged, dropped out, or the like. Moreover, soldering the positive electrode terminal strip and the wiring board is not preferable, since the thin aluminum plate composing the positive electrode terminal strip is brought to high temperature, and the inside temperature of the battery also becomes high, resulting in the battery degradation.

The present invention has been achieved in view of the above problems. It is an object of the invention to provide a method of manufacturing a battery comprising the step of welding an electrode made of aluminum, an aluminum base alloy, or the like, and a metal plate made of a nickel base alloy or the like, in a polymer lithium ion secondary battery or the like, by means of an electric resistance welding process comprising an electric resistance welding step of securely welding the electrode and the metal plate, with eliminating the problems of poor welding such as hole generation or scattering to the surroundings due to the spilled metal in a welding part, and a battery with high reliability and durability in which a metal plate and an electrode are securely welded by such method.

It is another object of the invention to provide a method of manufacturing a weldment in which two or more objects being welded which made of a different material are easily welded by the electric resistance welding with high reliability, and a pedestal used for the method.

SUMMARY OF THE INVENTION

A battery according to the present invention comprises a secondary battery cell with ability of charge and discharge of electricity, a plate-like electrode which is connected to the secondary battery cell and produces conduction of the electricity during charging and discharging, and metal plates being welded to the electrode, which have a melting point higher than that of the electrode or which are thicker than the electrode and have the same melting point, wherein at least one of the metal plates is welded to each of the sides of the electrode.

Moreover, a battery according to the present invention comprises a secondary battery cell with ability of charge and discharge of electricity, a plate-like electrode which is connected to the secondary battery cell and produces conduction of the electricity during charging and discharging, and a metal plate being welded to the electrode, which has a melting point higher than that of the electrode or which is thicker than the electrode and has the same melting point, wherein the metal plate has a part with a form like a single piece of plate bent into a roughly horseshoe shape, the electrode is sandwiched between two boards of the roughly horseshoe shape, and at least one of the two boards is welded to the electrode.

A method of manufacturing a battery according to the present invention comprises the step of welding metal plates which have a melting point higher than that of a plate-like electrode or which are thicker than the plate-like electrode and have the same melting point, to the plate-like electrode which is connected to a secondary battery and produces electricity conduction during charging and discharging of the secondary battery, wherein at least one of the metal plates is welded to each of the sides of the electrode by means of an electric resistance welding process or other welding method in the step of welding the metal plates.

Moreover, another method of manufacturing a battery according to the present invention comprises the step of welding a metal plate which has a melting point higher than that of a plate-like electrode or which is thicker than the plate-like electrode and has the same melting point, to the plate-like electrode which is connected to a secondary battery and produces. electricity conduction during charging and discharging of the secondary battery, wherein in the step of welding the metal plates, the metal plate has a part with a form like a single piece of plate bent into a roughly horseshoe shape, and the step of welding comprises sandwiching the electrode between two boards of the roughly horseshoe shape, and performing a electric resistance welding of at least one of the two boards and the electrode.

A method of manufacturing a weldment according to the present invention comprises placing two or more objects being welded which made of a different material on a pedestal, and performing the electric resistance welding with pressing a welding rod, wherein at least a placing surface of the pedestal is composed of a refractory metal with a melting point higher than those of the two or more objects being welded.

A pedestal according to the present invention is the one where objects being welded are placed onto during the welding thereof and at least a placing surface is composed of a metal with a melting point higher than 1455° C.

According to the battery and the method of manufacturing the same of the invention, the electrode made of the metal material with a comparatively low melting point like aluminum or the aluminum base alloy is sandwiched between the metal plates with the melting point higher than that of the electrode, and the welding is performed by raising the welding temperature to the high temperature at which the surfaces of the metal plates facing the electrode can be fused to form an alloy together with the surfaces of the electrode by means of the electric resistance welding. Even if the electrode made of the metal material with the melting point lower than that of the metal plate, at this time, is dissolved enough to be penetrated in the thickness direction, no dissolved metal of the electrode is spilt out or scattered to the exterior, because the upper and lower sides of the corresponding part of the electrode are sandwiched between the metal plates. And the metal plates are welded to both the upper and lower sides of one plate of the electrode, and the mechanical strength is higher and the area of the electric connection is larger than the conventional case where the metal plate is welded only to either of the upper and lower sides.

According to another battery and the method of manufacturing the same of the present invention, furthermore, the metal plate is formed by bending a single piece of plate (one plate) into a roughly horseshoe shape, and the electrode is sandwiched between the two boards of the horseshoe shape. Therefore, the step of positioning and fixing individually the metal plates respectively to the upper and lower sides of the electrode in the electric resistance welding, is not required.

According to the method of manufacturing the weldment of the invention, at least the placing surface of the pedestal is composed of the refractory metal with the melting point higher than those of the objects being welded, which prevents the pedestal from dissolving with the objects being welded at the time of the welding, and also prevents the objects being welded from adhering on the pedestal. Moreover, the excessive dissolution of the objects being welded is prevented because of the heat release effect of the pedestal. Furthermore, since a welding current flows also through the pedestal, more welding current flows through the weld part of the objects being welded.

According to pedestal of the present invention, at least the placing surface is composed of the metal with the melting point higher than 1455° C., as well as the method of manufacturing the weldment of the invention, so the adhesion and the excessive dissolution of the object being welded are prevented, and a large welding current flows through the weld part.

Other and further objects, features and advantages of the invention will appear more fully from the following description.

DETAILED DESCRIPTION OF THE PRESENTLY PREFERRED EMBODIMENTS

Embodiments of the present invention will be described in detail below with reference to accompanying drawings. In addition, a lithium ion secondary battery according to an embodiment of the invention is embodied by the manufacture method comprising the step of the electric resistance welding, so those will be described together hereinafter for every embodiment.

First Embodiment

Figure 1:
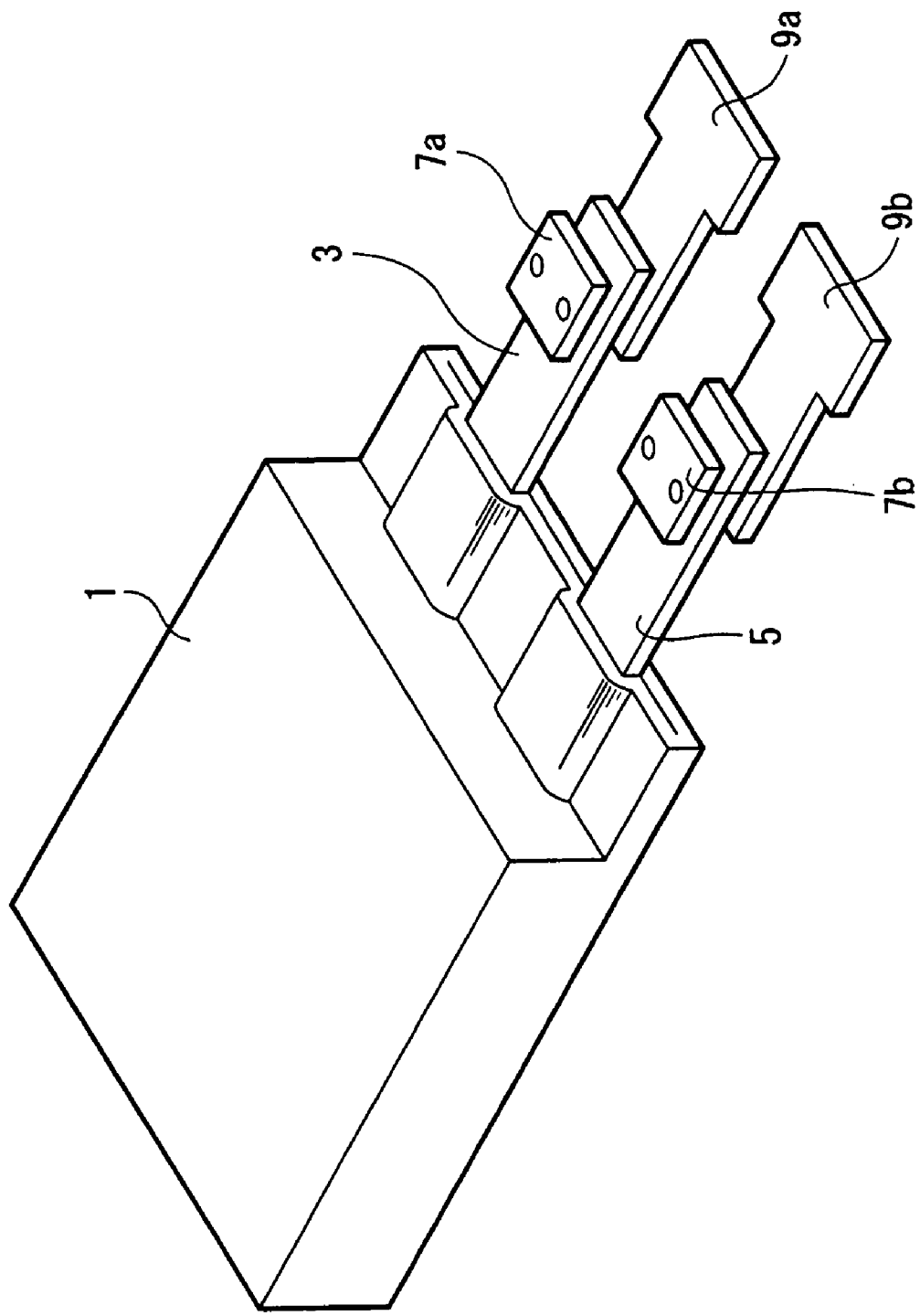
FIG. 1 is a view showing a schematic structure of a lithium ion secondary battery according to a first embodiment of the invention.

FIG. 1 shows a schematic structure of a lithium ion secondary battery according to a first embodiment of the invention.

The lithium ion secondary battery has a principal part constituting of a secondary battery cell 1, a pole/terminal of positive electrode 3, a pole/terminal of negative electrode 5, an upper metal plate 7a and a lower metal plate 9a on the positive pole/terminal, and an upper metal plate 7b and a lower metal plate 9b on the negative pole/terminal. And, in fact, the principal part with these elements is covered with a coating material such as an aluminum laminate film, while the coating material have been left out of the illustration in order to show an internal structure clearly here. Moreover, for convenience, the metal plates positioned on the upper side and lower side on the basis of the vertical direction in the figure, shall be here called upper metal plates 7a and 7b and lower metal plates 9a and 9b respectively, while this is not to say that it is possible to reverse the vertical relation as long as the structure has the metal plates respectively welded to the both sides of each electrode to be sandwiched therebetween.

The secondary battery cell 1 is the so-called polymer lithium ion type cell using a solid polymer electrolyte, for example. In view of balance with the internal structure, it is common that the pole/terminal of positive electrode 3 is made of aluminum or an aluminum base alloy in such a polymer lithium ion type secondary battery cell 1. If the pole/terminal of positive electrode 3 is made of a material which is different from aluminum or the aluminum base alloy, disadvantages often occur. For example, the material may have a potential which is different from that of a positive electrode charge collector inside the secondary battery cell 1, or be eluted to the electrolyte, and therefore, aluminum or the aluminum base alloy is used most preferably as the pole/terminal of positive electrode 3. Moreover, a material made of nickel or a nickel base alloy is preferably used as the pole/terminal of negative electrode 5.

Each of the upper metal plate 7a and the lower metal plate 9a on the positive pole/terminal, and the upper metal plate 7b and the lower metal plate 9b on the negative pole/terminal, is one metal plate made of nickel or the nickel base alloy, is thicker than the pole/terminal of positive electrode 3 or the pole/terminal of negative electrode 5, and has high mechanical strength and excellent conductivity. The lower metal plates 9a and 9b on the positive and negative poles/terminals have one longitudinal end which is welded to a corresponding tip portion of the pole/terminal of positive electrode 3 or the pole/terminal of negative electrode 5, and the other end formed into a broad shape to be used as a terminal for external connection. The upper metal plates 7a and 7b on the positive and negative poles/terminals are welded to upper surfaces of the tip portions of respectively the pole/terminal of positive electrode 3 and the pole/terminal of negative electrode 5 covering a larger part including an area where it is expected that the pole/terminal of positive electrode 3 or the pole/terminal of negative electrode 5 is welded during the electric resistance welding.

As described above, the upper metal plate 7a and the lower metal plate 9a on the positive pole/terminal are welded respectively above and below the pole/terminal of positive electrode 3 to be sandwiched therebetween, and the upper and lower metal plates 7b and 9b on the negative pole/terminal are welded respectively above and below the pole/terminal of negative electrode 5 to be sandwiched therebetween. Therefore, as described below, the generation of the poor welding can be eliminated in the above cases of the electric resistance welding, and moreover, the mechanical strength and the conductivity in the welds of the upper metal plates 7a and 7b and the lower metal plates 9a and 9b respectively to the pole/terminal of positive electrode 3 and the pole/terminal of negative electrode 5 in the manufactured lithium ion secondary battery, can be increased. As a result, further improvements in the reliability and the durability of the lithium ion secondary battery as a product can be achieved.

Figure 2:
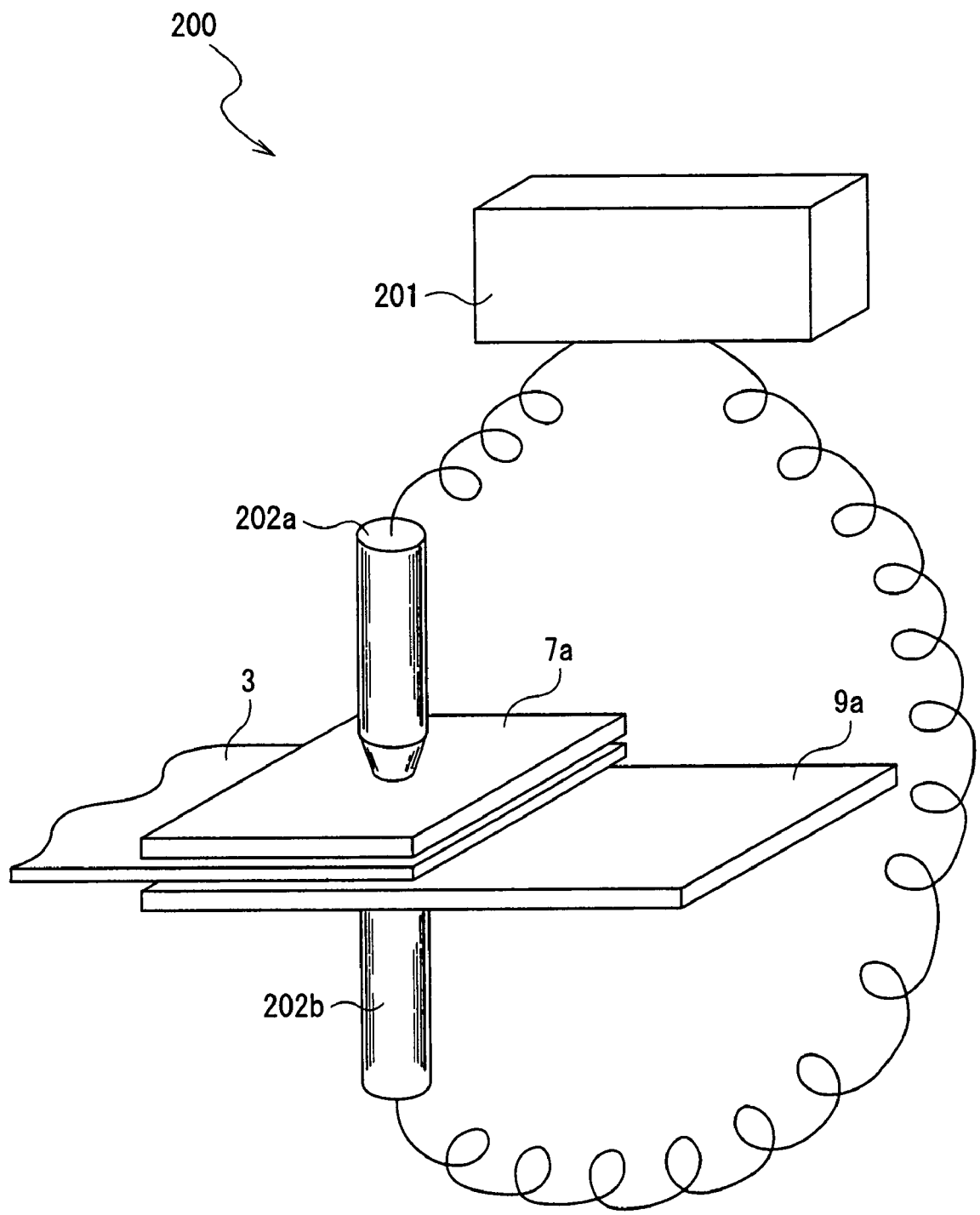
FIG. 2 is a view showing an electric resistance welder of an in line (direct) spot welding system used for the step of welding an electrode and metal plates in the first embodiment of the invention and an example of a welding operation performed by the same.

FIG. 2 shows an electric resistance welder used for the step of welding the electrodes and metal plates in the lithium ion secondary battery with the schematic elements as described above and an example of the welding operation performed by the same.

The electric resistance welder 200 has a principal part constituting of an electric welding control device 201 and pole bolts 202a and 202b. The electric welding control device 201 incorporates an electric current generating apparatus (which is not shown), such as the direct current transistor system where the electricity accumulated to the mass capacitor is discharged by the field effect transistor, the direct current inverter system where the duties of the output voltage and the output current, these frequencies, and the like are controlled using the so-called direct current inverter, or AC power supply system using the alternator set to the predetermined frequency. The electric power outputted from the electric current generating apparatus is supplied to a welding spot through the pole bolts 202a and 202b.

In the case of the direct current transistor system, the electric resistance welding is performed by applying comparatively small electric power to objects being welded over a longer duty than other systems, for example, the output voltage at the time of electric resistance welding is 0.5-3 V, and the welding time is 5-300 ms. Moreover, in the case of the direct current inverter system, since the output voltage and the output current can be controlled with high precision for a longer time as compared to the direct current transistor system, it is possible to maintain the output current at a constant value during the electric resistance welding. Therefore, according to the direct current inverter system, it is possible to allow the temperature of the welding spot to follow a desired value more precisely than other systems, consequently the welding state can be stabilized. In the direct current inverter system, at the time of the electric resistance welding, the output voltage is 0.5-2 V, and the welding time is 5-200 ms, for example.

The pole bolts 202a and 202b may have a tip form such as a cylinder, a rectangular parallelepiped, a half sphere, a cone, or a trapezoid, and for example, the cylinder or the half sphere form generally used can be applied.

In the electric resistance welder, the electric resistance welding is performed by disposing the upper metal plate 7a on the upper surface of the pole/terminal of positive electrode 3, furthermore disposing the lower metal plate 9a on the undersurface, pressing the pole bolts 202a and 202b respectively to those plates as the objects being welded from the top and bottom surfaces thereof with a predetermined press power, and applying a predetermined amount of the electric current in a predetermined timing with a predetermined voltage. At this time, it is preferable to adjust the positions of pressing the pole bolts 202a and 202b to be in a straight line from the upper side to the lower side. Such a spot welding may be performed on one place (one spot) per object being welded which consists of a set composed of the pole/terminal of positive electrode 3, the upper metal plate 7a, and the lower metal plate 9a, or may be performed on two or more places. By performing the spot welding on two places, the welding can be much harder, and it is possible to prevent the mechanical totter and the like of the pole/terminal of positive electrode 3, and the upper metal plate 7a and the lower metal plate 9a, and then the electric connection states therebetween can be more excellent.

When the predetermined voltage is applied to the upper and lower pole bolts 202a and 202b, for example, the electric current flows from the upper pole bolt 202a to the lower pole bolt 202b, through the upper metal plate 7a, the pole/terminal of positive electrode 3, and the lower metal plate 9a in this order, in the thickness direction. Then, heat is generated in the upper metal plate 7a, the pole/terminal of positive electrode 3, and the lower metal plate 9a, concentrating on parts where the electric current has flowed, soon the parts are fused, both the aluminum base alloy of the pole/terminal of positive electrode 3, and the nickel base alloy of the upper metal plate 7a and the lower metal plate 9a are melted and mixed to form a new alloy, which realizes the hard welding. At this time, the melting point of the aluminum base alloy of the pole/terminal of positive electrode 3 is about 660° C., and the melting point of the nickel base alloy of the upper metal plate 7a and the lower metal plate 9a is about 1455° C., that is, the difference between the melting points is about 800° C. In order to enable the formation of a layer of the new alloy with the aluminum base alloy (which includes an aluminum simple substance, and so forth) by melting the nickel base alloy with high melting point, the electric power suitable for the formation is applied from the pole bolts. Thus, the temperature of the parts which the pole bolts 202a and 202b are in contact to become as high as 1500° C. or higher.

At such high temperature, the aluminum base alloy dissolves completely and presents a liquid phase. For this reason, in the conventional general electric resistance welding where the pole bolts 202a and 202b are directly in contact to the pole/terminal of positive electrode 3 made of the aluminum base alloy, the aluminum base alloy completely dissolved by the pole bolts 202a and 202b is spilt out or scattered, and then, the poor welding occurs, for example, the dissolved part is pierced, or the welding state becomes such brittle as the welding is peeled away by weak external force.

However, according to the method of the electric resistance welding of the embodiment, the upper metal plate 7a and the lower metal plate 9a which made of the thick nickel base alloy with high melting point are respectively positioned on both the upper and lower surfaces of the pole/terminal of positive electrode 3, and the pole/terminal of positive electrode 3 is sandwiched therebetween. Thus, even if the aluminum base alloy of the pole/terminal of positive electrode 3 completely dissolves into a liquid phase in the thickness direction, the upper metal plate 7a and lower metal plate 9a can stop (obstruct) the meltage from spilling out or scattering outside.

Moreover, the boiling point of the aluminum base alloy of the pole/terminal of positive electrode 3 is about 2480° C., and at such high temperature, the aluminum base alloy which dissolved completely may boil and scatter violently. However, according to the method of electric resistance welding of the embodiment, it is the upper metal plate 7a and the lower metal plate 9a that the pole bolts are directly in contact to, and the heat generation, which results from the flow of the welding current corresponding to the electric resistances in the joint surface between the pole bolt 202a and the upper metal plate 7a, in the joint surface between the upper metal plate 7a and the pole/terminal of positive electrode 3, in the joint surface between the pole/terminal of positive electrode 3 and the lower metal plate 9a, and in the joint surface between the lower metal plate 9a and the pole bolt 202b, flows into the pole/terminal of positive electrode 3 indirectly. Moreover, the pole bolt 202a and pole bolt 202b are not directly in contact to the pole/terminal of positive electrode 3, so the thermal storage is generated at the time of the welding, and due to the adhesion of the dissolved aluminum base alloy of the pole/terminal of positive electrode 3 to the pole bolt 202a and the pole bolt 202b, the loss of the dissolved part or the like can be prevented. Therefore, heating the aluminum base alloy of the pole/terminal of positive electrode 3 to such high temperature as the alloy scatters can be reduced, and thus it is avoidable that the completely dissolved aluminum base alloy of the pole/terminal of positive electrode 3 scatters or the like. Furthermore, the pressure of the weld part directly under the pole bolts is high, so the boiling point also becomes high, and the aluminum base alloy can be difficult to boil. Here, the heating value Q in a weld part can be expressed by the formula $Q=I^2 \times R$ wherein the R is the resistances of all the bonding surfaces and I is the welding current.

Here, generally, a very thin natural oxide film (alumina) is generated on the surface of the aluminum base alloy. When the setting temperature for the electric resistance welding is, for example, 1500° C. as described above, the alumina of the natural oxide film is incorporated and mixed in the aluminum base alloy with the liquid phase without being melted because the melting point is 2050° C. However, there is no trouble for the formation of the new alloy layer of the aluminum base alloy and the nickel base alloy, and the reliable and sure welding can be obtained.

Moreover, the electric current flowing through the upper metal plate 7a can be almost the same as the electric current flowing through the lower metal plate 9a by pressing the pole bolts 402a and 402b from the top and bottom sides of the objects being welded, and producing the electric current passing through the objects being welded in the thickness direction, and using the electric resistance welder 400 of the direct spot welding system as shown in FIG. 2, and the welding conditions in these upper and lower sides can be almost correspondingly arranged and optimized.

In addition, it is also possible to realize the upper metal plate 7a and the lower metal plate 9a made of a different metal material. For example, it is possible that the upper metal plate 7a is made of an iron base alloy, and the lower metal plate 9a is made of a nickel base alloy, or conversely, the upper metal plate 7a is made of the nickel base alloy, and the lower metal plate 9a is made of the iron base alloy.

Although the case, where the welding is performed on the pole/terminal of positive electrode 3, and the upper metal plate 7a, and the lower metal plate 9a, has been described in detail in the above explanation of the welding step, this is not to say that the welding of the pole/terminal of negative electrode 5, and the upper metal plate 7b and the lower metal plate 9b can also be performed by the same technique as the above.

Second Embodiment

Figure 4:
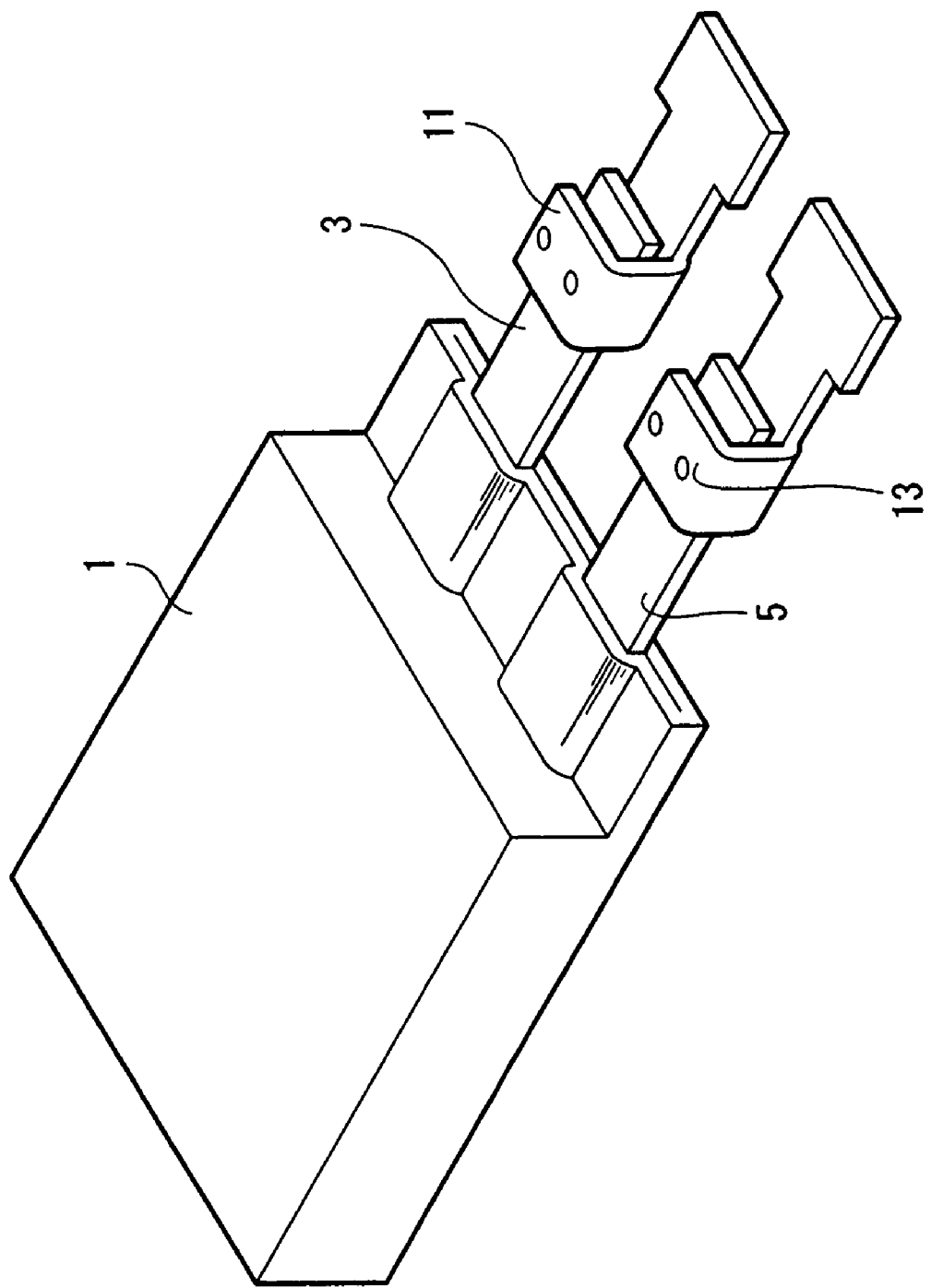
FIG. 4 is a view showing a schematic structure of a lithium ion secondary battery according to a second embodiment of the invention.

FIG. 4 shows a schematic structure of a lithium ion secondary battery according to a second embodiment of the invention. And in the embodiment, the same compositions as the first embodiment are marked in the same signs, the explanations thereof are omitted and only different points will be explained. The third embodiment and the following embodiments can also be described in the same way.

The lithium ion secondary battery has a principal part constituting of a secondary battery cell 1, a pole/terminal of positive electrode 3, a pole/terminal of negative electrode 5, a metal plate 11 on the positive pole/terminal, and a metal plate 13 on the negative pole/terminal. Among these components, the secondary battery cell 1, the pole/terminal of positive electrode 3, and the pole/terminal of negative electrode 5 are the same as those of the first embodiment.

Each of the metal plate 11 on the positive pole/terminal and the metal plate 13 on the negative pole/terminal is formed by performing the outline cutting or the bending and converting process on one metal plate made of nickel or a nickel base alloy, is thicker than the pole/terminal of positive electrode 3 or the pole/terminal of negative electrode 5, and has high mechanical strength and also excellent conductivity.

Each of these metal plates 11 and 13 on the positive pole/terminal and the negative pole/terminal has one longitudinal end bent into a horseshoe shape, where a tip portion of the pole/terminal of positive electrode 3 is welded to be sandwiched in a gap between two opposed boards in the horseshoe shape obtained by bending, and the other end formed into a broad shape in order to be used as a terminal for an external connection.

The metal plate 11 on the positive pole/terminal is differently welded so that the tip portion of the pole/terminal of positive electrode 3 may be sandwiched inside the horseshoe shape in order to cover a larger area of the pole/terminal of positive electrode 3 including an expected melting area in the electric resistance welding, the production of the poor welding can be eliminated in the electric resistance welding of the metal plate 11 on the positive pole/terminal and the pole/terminal of positive electrode 3 as described later. Moreover, the mechanical strength and the conductivity of the structure combining the metal plate 11 on the positive pole/terminal with the pole/terminal of positive electrode 3 in the manufactured secondary battery can be increased. As a result, the further improvements in the reliability and the durability as a product can be achieved. In addition, these things can also be achieved when welding the metal plate 13 on the negative pole/terminal and the pole/terminal of negative electrode 5, as well as the welding of the positive pole/terminal.

Figure 3:
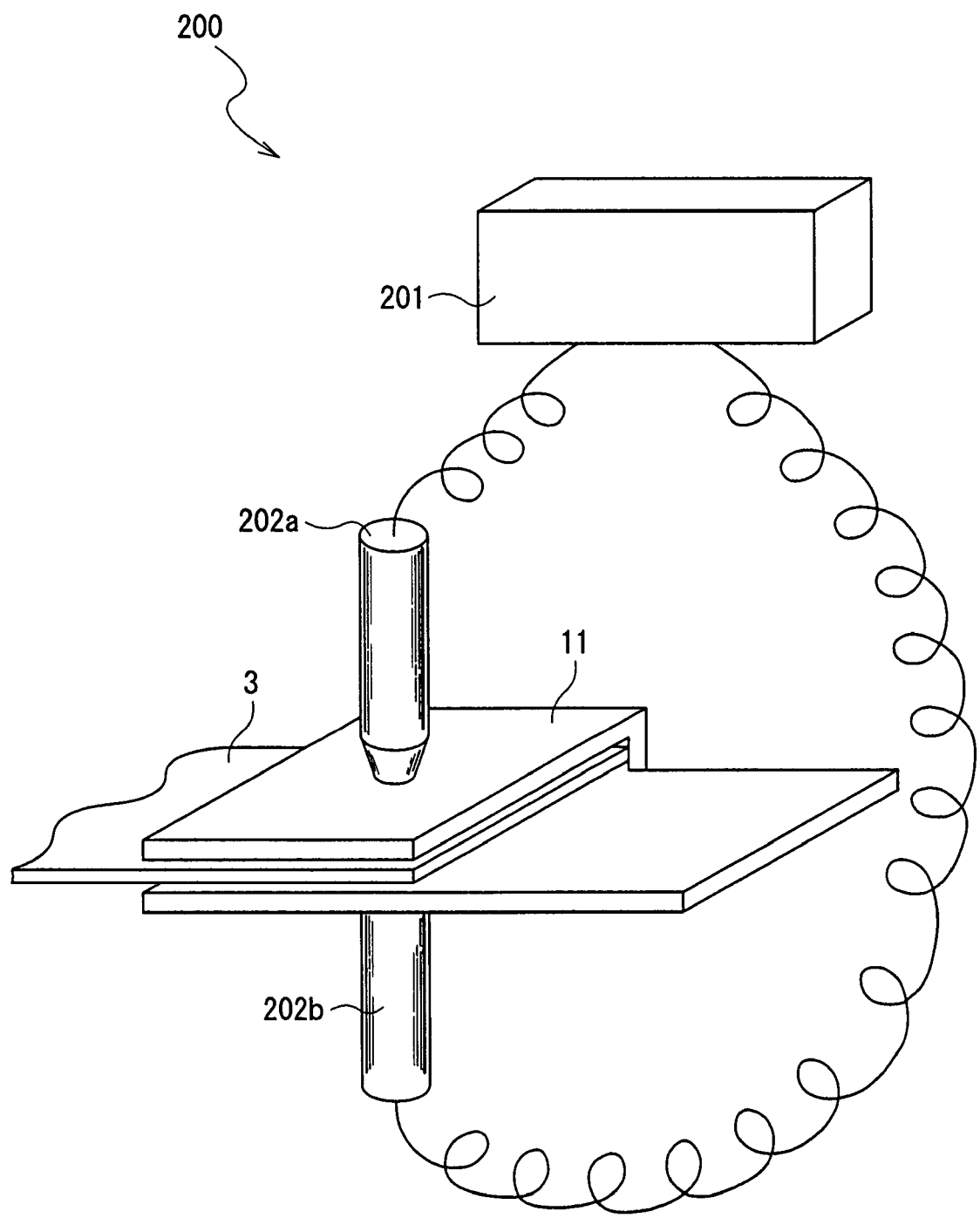
FIG. 3 is a view showing an electric resistance welder of an in line spot welding system used for the step of welding an electrode and a metal plate in a second embodiment of the invention and an example of a welding operation performed by the same.

The weldings of the pole/terminal of positive electrode 3 and the metal plate 11, and the pole/terminal of negative electrode 5 and the metal plate 13 in the lithium ion secondary battery having the above schematic structure, can be performed by using the same electric resistance welder 200 as shown in FIG. 2. More in detail, the electric resistance welding is performed by keeping the state of the tip portion of the pole/terminal of positive electrode 3 sandwiched inside the portion formed into the horseshoe shape of the end of the metal plate 11, and applying a predetermined amount of the electric current in a predetermined timing with a predetermined voltage, with pressing the pole bolts 202a and 202b with a predetermined press power respectively from both the upper and lower sides of the horseshoe-shaped metal plate 11, as shown in FIG. 3. Such a spot welding may be performed on one place per set of the electrode and the metal plate, or may be performed on two or more places.

According to the method of the electric resistance welding of the second embodiment, the pole/terminal of positive electrode 3 is sandwiched inside the metal plate 11 where the thick nickel base alloy with the high melting point is bent and converted into the horseshoe shape. Thus, even if the aluminum base alloy of the pole/terminal of positive electrode 3 completely dissolves into a liquid phase in the thickness direction, the two opposed boards formed into the horseshoe shape of the metal plate 11 can stop the meltage from spilling out or scattering outside. Moreover, the movement of the spill of the dissolved aluminum base alloy spill into the direction of the side surface of the pole/terminal of positive electrode 3 can be more surely obstructed in the portion on the closed side of the horseshoe-shaped surface of the metal plate 11. In addition, in the portion on the open side of the horseshoe shape, the spill of the dissolved aluminum base alloy into the plane direction of the metal plate 11 can be surely prevented by the surface tension as the liquid phase and the pull back pressure in the portion on the closed side, when the dissolved aluminum base alloy is not in the boiling mode.

Moreover, the boiling point of the aluminum base alloy of the pole/terminal of positive electrode 3 is about 2480° C., and at such high temperature, the aluminum base alloy which dissolved completely boil. It is the upper and lower boards processed into the horseshoe shape of the metal plate 11 that the pole bolts 202a and 202b reaching a high temperature by the thermal storage are directly in contact to, and the generated heat, which results from the flow of the welding current through the electric resistances in the joint surface between the pole bolt 202a and the metal plate 11 just under the pole bolt 202a, and in the joint surface between the metal plate 11 and the pole/terminal of positive electrode 3, flows into the pole/terminal of positive electrode 3 indirectly through the metal plate 11. It should be noticed that the pole bolt 202a and the pole bolt 202b are not directly in contact to the pole/terminal of positive electrode 3. In this way, heating the aluminum base alloy of the pole/terminal of positive electrode 3 to such high temperature, as the alloy boils, is reduced, and thus it is avoidable that the completely dissolved aluminum base alloy of the pole/terminal of positive electrode 3 spills out, scatters, or the like.

Moreover, since the metal plates 11 and 13 are formed by bending one thin plate of the nickel base alloy into the horseshoe shape, the two boards respectively sandwiching the pole/terminal of positive electrode 3 or the pole/terminal of negative electrode 5 from above and below are not the individually separated boards on the upper and lower sides like the upper metal plates 7a and 7b and the lower metal plates 9a and 9b of the first embodiment. Therefore, the preparation for the welding is completed only by equipping the pole/terminal of positive electrode 3 into the gap of the horseshoe shape of such a metal plate, and thus, there is an advantage of being able to simplify more such a welding preparation step (a pre-process for the welding).

Moreover, the electric current can be produced to pass through the objects being welded in the thickness direction, with pressing the pole bolts 202a and 202b from the top and bottom sides of the objects being welded as shown in FIG. 3, and thus, the electric current flowing through the upper parts of the metal plates 11 and 13 can be almost the same as the electric current flowing through the lower parts thereof, and the welding conditions of these upper and lower sides can be almost correspondingly arranged and optimized, and wattless current can be decreased.

Figure 5:
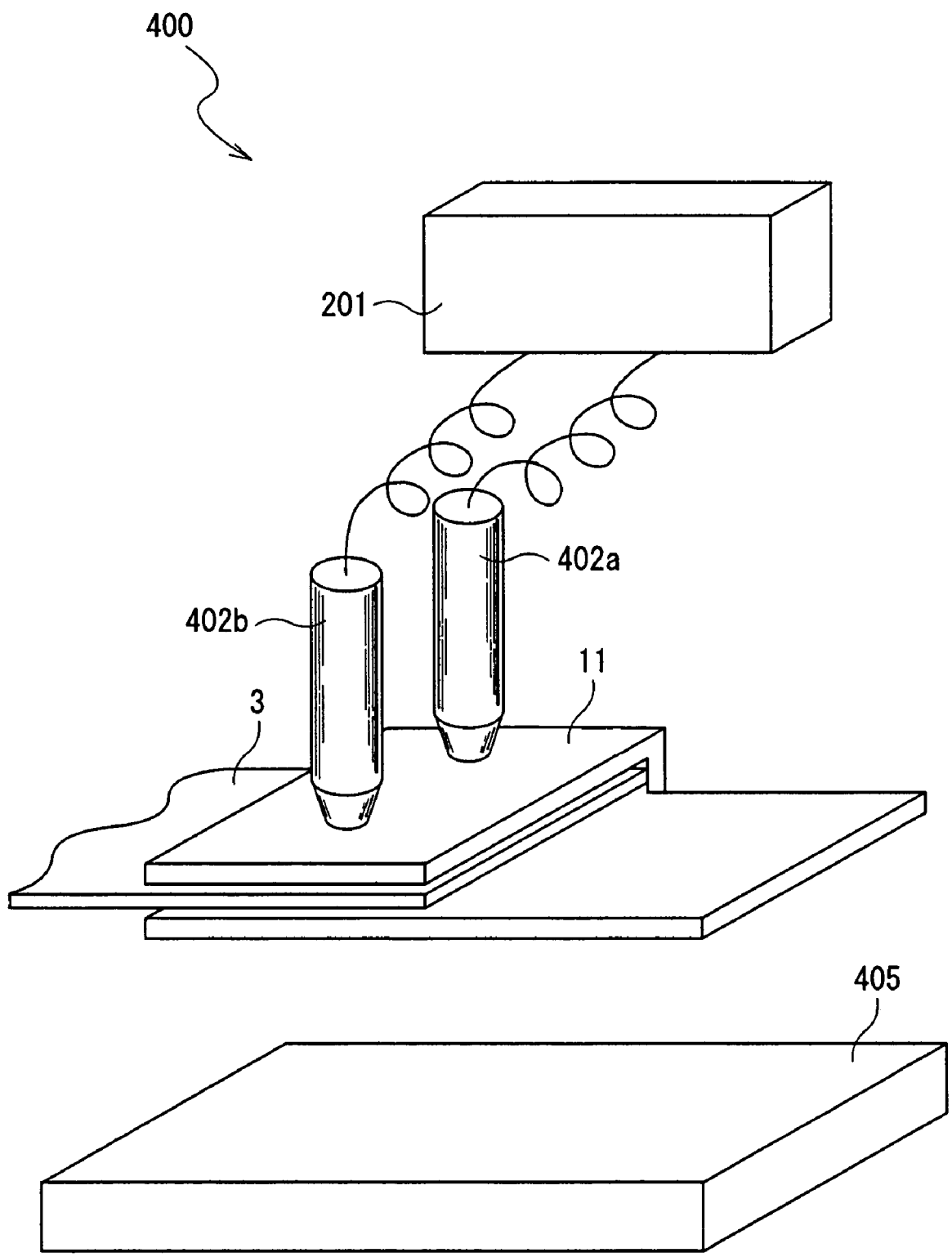
FIG. 5 is a view showing an electric resistance welder of a series spot welding system used for the step of welding an electrode and a metal plate and an example of a welding operation performed by the same.

Moreover, as showing an example in FIG. 5, in the welding by using the electric resistance welder 400 of the so-called series spot welding system where two pole bolts 402a and 402b respectively for the positive and negative poles/terminals are positioned in parallel, both the two pole bolts 402a and 402b is in contact to the top surface side of the objects being welded, and therefore, the electric current at the time of the welding tends to pass through the upper boards of the metal plates 11 and 13 with the horseshoe shape, and the upper surfaces of the pole/terminal of positive electrode 3 and the pole/terminal of negative electrode 5. For this reason, the sufficient electric current does not pass through the lower boards of the metal plates 11 and 13 with the horseshoe shape, and the bottom surfaces of the pole/terminal of positive electrode 3 and the pole/terminal of negative electrode 5, and there is a case where the sure welding becomes impossible on such a lower side. However, each of the upper board of the horseshoe shape of the metal plates 11 and 13 is expanded to the lower board to become a single plate. Thus, the occurrence of the perfect poor welding of the metal plates 11 and 13 respectively to the pole/terminal of positive electrode 3 and the pole/terminal of negative electrode 5 can be reduced, by certainly welding at least the upper boards of the metal plates 11 and 13 respectively to the upper surfaces of the pole/terminal of positive electrode 3 and the pole/terminal of negative electrode 5, even if the welding on the lower side is inadequate.

In addition, in performing the welding by using the electric resistance welder 400 of the series spot welding system, generally, a pedestal 405 is positioned under an object being welded. As the pedestal, for example, a material of copper, a copper base alloy, platinum, a platinum base alloy, nickel, a nickel base alloy, titanium, a titanium base alloy, chromium, a chromium base alloy, zirconium, a zirconium base alloy, beryllium, a beryllium base alloy, or the like, is preferable. Or in addition to the above, it is possible to use a thick plate, for example, an alloy of copper, cadmium, chromium, titanium, or beryllium, an alumina scattering strengthened copper, a chromium-copper, or a copper base alloy, having a surface bonded to a platinum thin plate.

Third Embodiment

Figure 6:
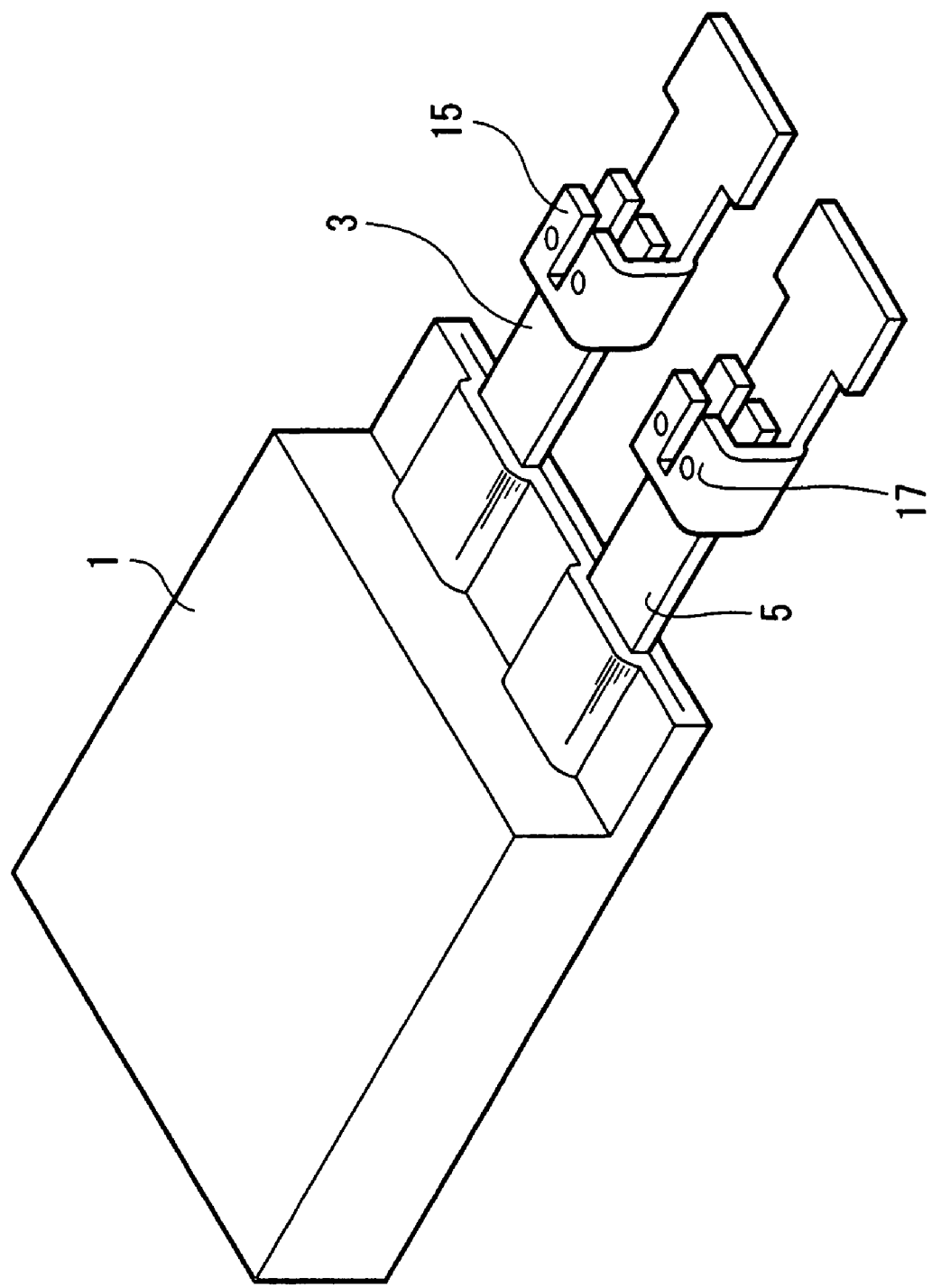
FIG. 6 is a view showing a schematic structure of a lithium ion secondary battery according to a third embodiment of the invention.

FIG. 6 shows a schematic structure of a lithium ion secondary battery according to a third embodiment of the invention.

The lithium ion secondary battery has a principal part constituting of the secondary battery cell 1, a pole/terminal of positive electrode 3 with a tip portion having a slit-like cut, a pole/terminal of negative electrode 5 similarly with a tip portion having a slit-like cut, a metal plate 15 on the positive pole/terminal where a tip portion thereof is bent and converted into a horseshoe shape and an upper board thereof has a slit-like cut, and a metal plate 17 on the negative pole/terminal where a tip portion thereof is similarly bent and converted into a horseshoe shape and an upper board thereof has a slit-like cut.

Figure 7:
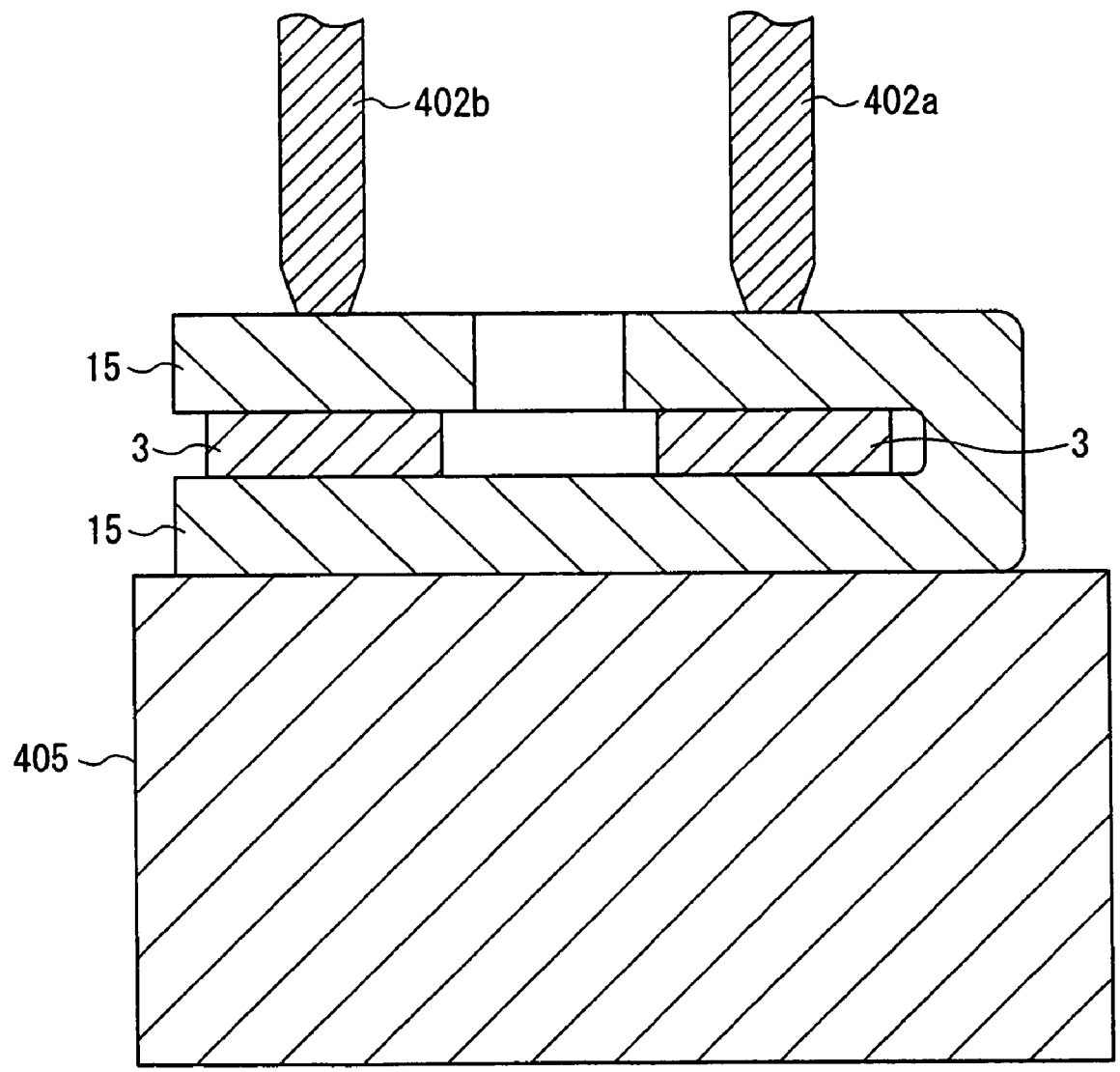
FIG. 7 is a view showing a state of welding the electrode and the metal plate in the secondary battery shown in FIG. 5.

In the steps of welding the pole/terminal of positive electrode 3 and the metal plate 15 with the electric resistance welding process, and welding the pole/terminal of negative electrode 5 and the metal plate 17 with the electric resistance welding process, in the lithium ion secondary battery, the sure welding can be performed by using the electric resistance welder 400 of the series spot welding system as shown in FIG. 5. That is, as shown in FIG. 7, when the electric current for the electric resistance welding is supplied by contacting one of two ranges separated by the slit to the pole bolt 402a, and the other to the pole bolt 402b, even if the electric current is intended to be shorted through the upper board of the metal plate 15, the current flow at that time is prevented by the slit located in the center. As a result, the electric current passes from the pole bolt 402a on one side (the positive pole/terminal) to the pole bolt 402b on the other side (the negative pole/terminal), through an area on one side of the upper board of the metal plate 15, an area on one side of the pole/terminal of positive electrode 3, a part of the lower board of the metal plate 15 located under the pole bolt 402a, a pedestal 405, a part of the lower board of the metal plate 15 located under the pole bolt 402b, an area on the other side of the pole/terminal of positive electrode 3 separated by the slit, and an area on the other side of the upper board of the metal plate 15 separated by the slit in this order, and the heat required for the welding of the pole/terminal of positive electrode 3 and the metal plate 15 is certainly produced by the electric resistance in the electric current path. In this way, even when the electric resistance welder of the series spot welding system is used, the welding of the pole/terminal of positive electrode 3 and the metal plate 15 can be performed certainly and simply.

Figure 8:
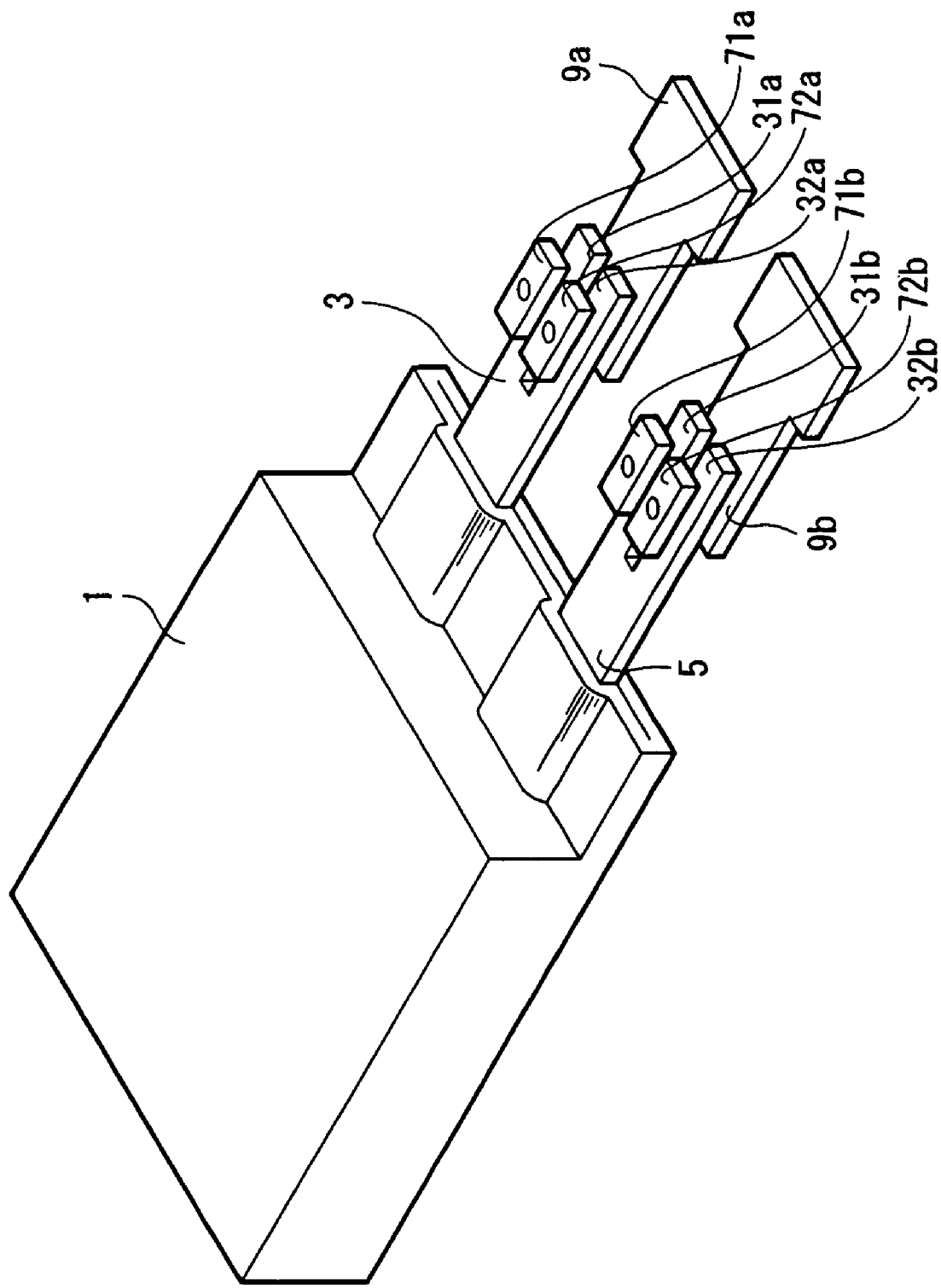
FIG. 8 is a view showing a schematic structure of a lithium ion secondary battery where the upper metal plates are consisted of two divided smaller plates, a pole/terminal of positive electrode have a tip portion with a slit, and the part to be welded is divided into two areas.
Figure 9:
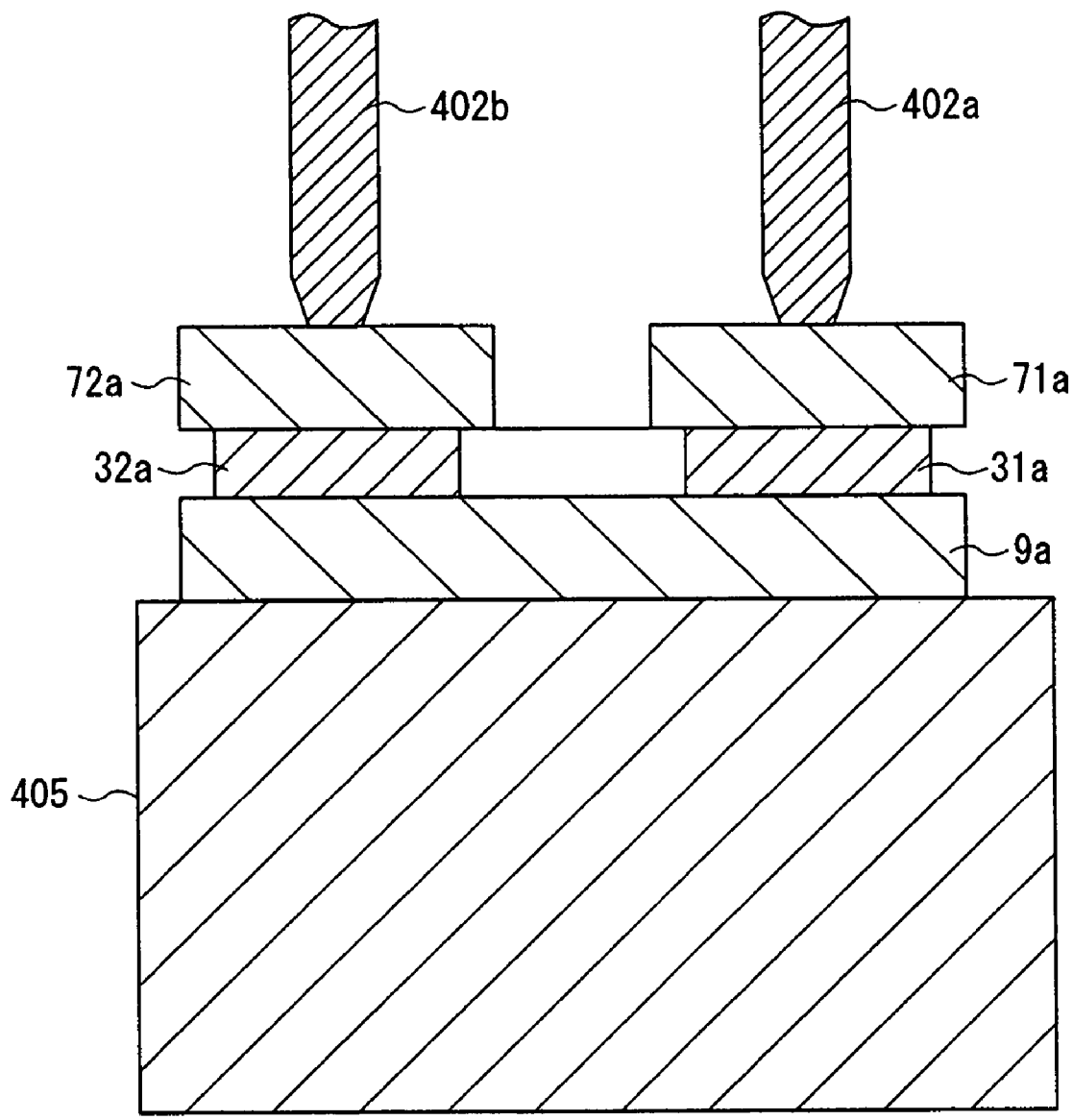
FIG. 9 is a view showing a state of welding the upper metal plate and the lower metal plate to the pole/terminal of positive electrode in the lithium ion secondary battery with the schematic structure shown in FIG. 8.

Here, the technique of locating such a slit in the metal plate 15 and the pole/terminal of positive electrode 3, and welding by using the electric resistance welder of the series spot welding system, is also applicable to the case where the two metal plates 7a and 7b and the pole/terminal of positive electrode 3 which is sandwiched therebetween are welded as described in the first embodiment. That is, as shown in FIG. 8, while the upper metal plate 7a is divided into two smaller plates 71a and 72a, a slit is provided also in each tip portion of the pole/terminal of positive electrode 3 and the pole/terminal of negative electrode 5, and the part to be welded is divided into two sections 31a and 32a. Also in the case of such a shape, as shown in FIG. 9, when the electric current for the electric resistance welding is supplied by contacting the pole bolts 402a and 402b respectively to the two divided upper metal plates 71a and 72a, the electric current passes, for example, from the pole bolt 402a on one side (the positive pole/terminal) to the pole bolt 402b on the other side (the negative pole/terminal), through one plate 71a of the upper metal plates, one section 31a of the pole/terminal of positive electrode 3, a part of the metal plate 9a located under the pole bolt 402a, a pedestal 405, a part of the metal plate 9a located under the pole bolt 402b, the other section 32a separated by the slit of the pole/terminal of positive electrode 3, and the other plate 72a of the upper metal plates in this order, and the heat required for the weldings of the upper metal plates 71a and 72a and the pole/terminal of positive electrode 3, and the welding of the pole/terminal of positive electrode 3 and the metal plate 9a, is certainly produced by the electric resistance in a series of the electric current paths. Thus, the welding can be performed certainly and simply, even when welding the upper metal plates 71a and 72a, the pole/terminal of positive electrode 3, and the lower metal plate 9a by using the electric resistance welder of the series spot welding system.

In addition, although the electric resistance welding on the positive pole/terminal, especially, the welding of the pole/terminal of positive electrode 3 and a metal plate 15, has been described in detail in the above explanation based on FIGS. 7 and 9, this is not to say that the welding of the pole/terminal of negative electrode 5 can also be performed by the same welding method.

Fourth Embodiment

Figure 10:
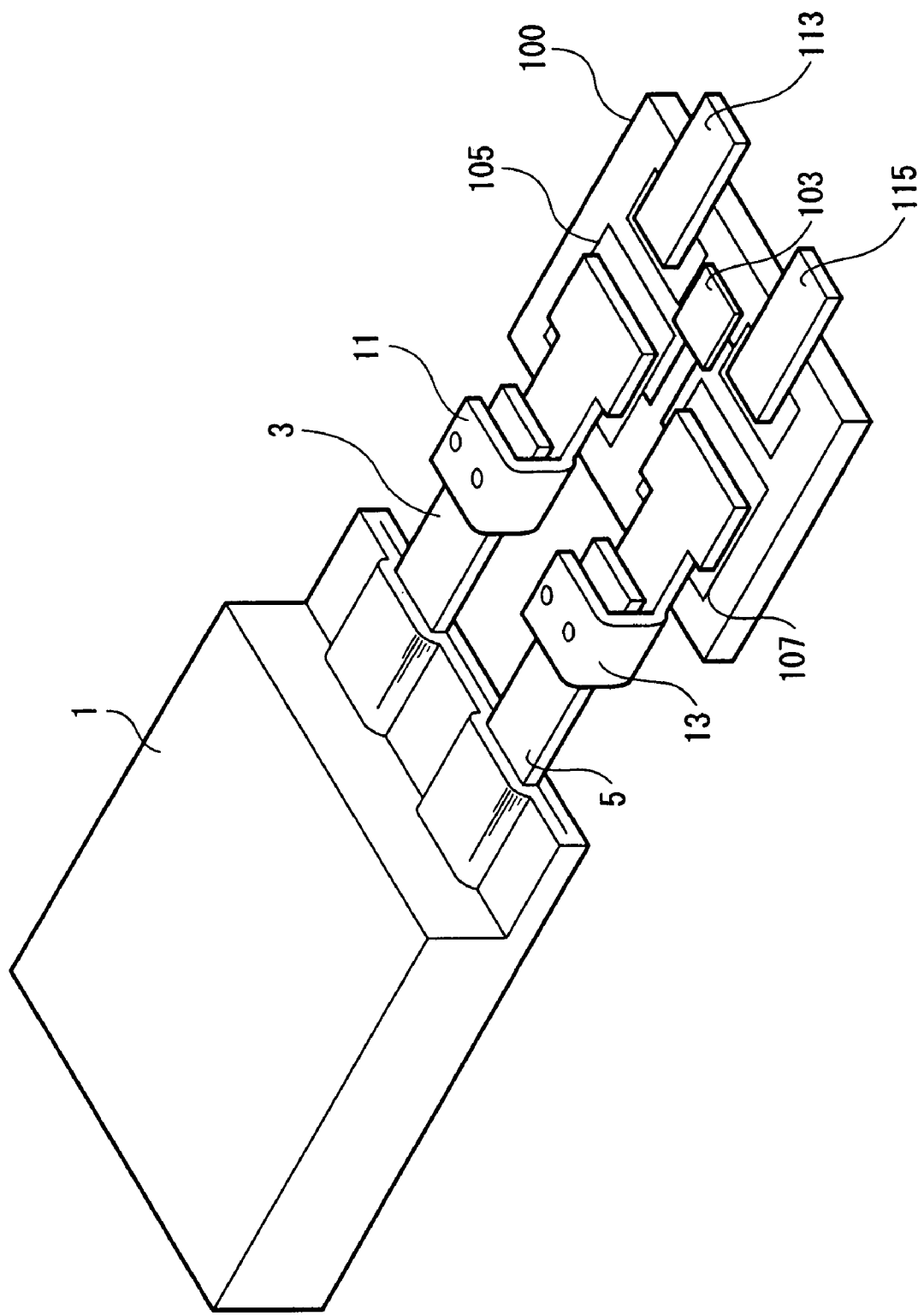
FIG. 10 is a view showing a schematic structure of a lithium ion secondary battery according to a fourth embodiment of the invention.

FIG. 10 shows a schematic structure of a lithium ion secondary battery according to a fourth embodiment of the invention.

The lithium ion secondary battery has a structure in which the metal plates 11 and 13 with a tip portion bent and converted into a horseshoe shape are welded respectively to the pole/terminal of positive electrode 3 and the pole/terminal of negative electrode 5 as described in the second embodiment, and these metal plates 11 and 13 are soldered to a printed wiring board 100 of a protection circuit.

Figure 11:
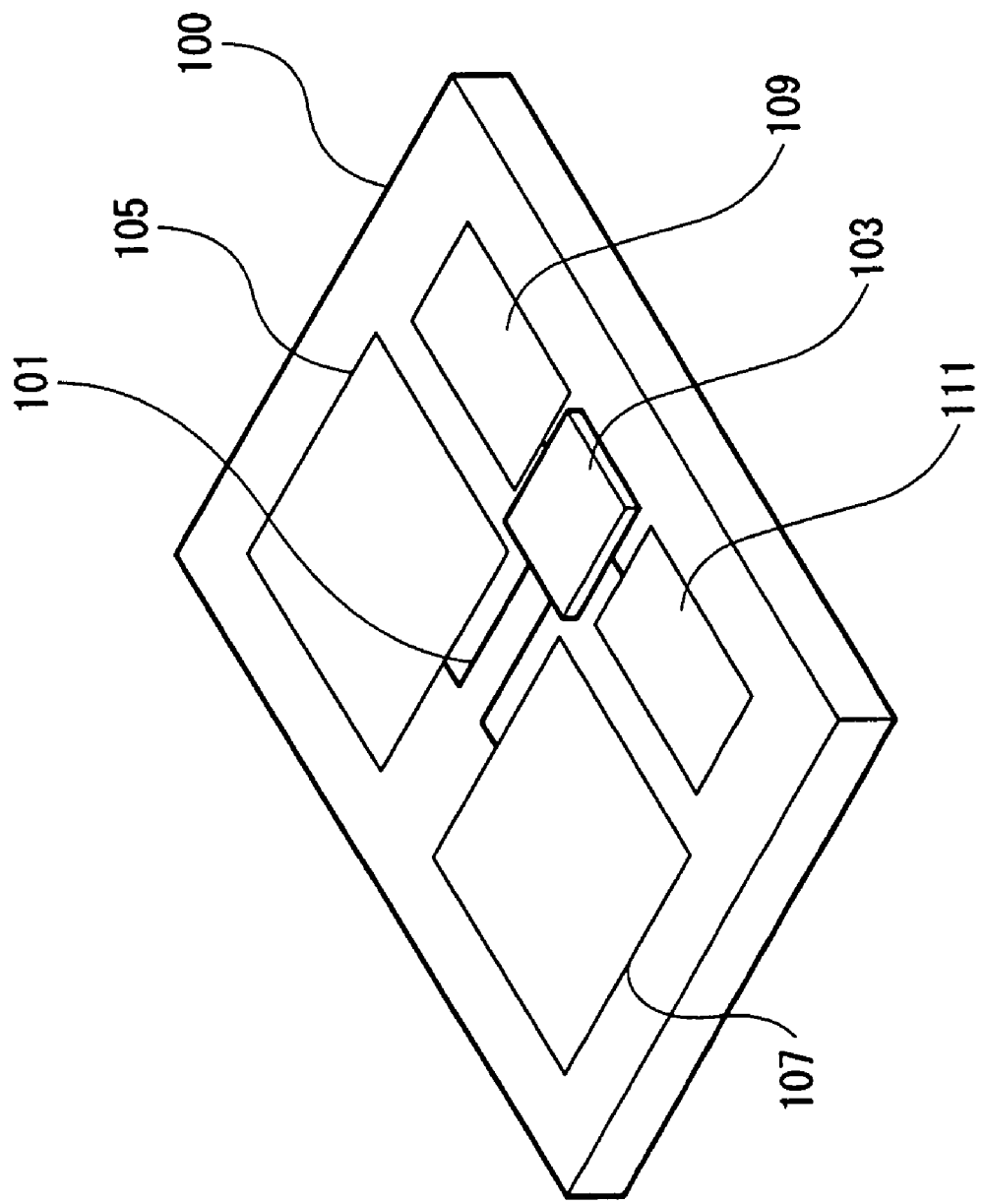
FIG. 11 is a view showing a schematic structure of a printed wiring board.

As typically shown in FIG. 11, a predetermined wiring circuit pattern 101 is formed on the printed wiring board 100, and an electronic part 103 is mounted thereon, in order to compose the so-called protection circuit which functions for protecting a secondary battery cell 1 from a charge by excessive voltage, a charge and discharge by excessive electric current, a too little voltage discharge, or the like.

More in detail, on the surface of the printed wiring board 100, a land 105 for positive pole/terminal of metal plate connection and a land 107 for negative pole/terminal of metal plate connection are located, and furthermore, a land 109 for positive external terminal connection jointed positive electrode and a land 111 for negative external terminal connection jointed negative electrode, which are connected to the electronic part 103 through the predetermined printed circuit pattern 101 or the like. A positive external terminal 113 jointed positive electrode is soldered to the land 109 for positive pole of external terminal connection, and a negative external terminal 115 jointed negative electrode is soldered to the land 111 for negative pole of external terminal connection. The metal plate 11 on the positive pole/terminal is soldered to the land 105 for positive pole/terminal of metal plate connection, and the metal plate 13 on the negative pole/terminal is soldered to the land 107 for negative pole/terminal of metal plate connection. The soldering of these metal plates 11 and 13 is performed after or before the step of the electric resistance welding of these plates to the pole/terminal of positive electrode 3 and the pole/terminal of negative electrode 5.

The positive pole of external terminal 113 and the negative pole of external terminal 115 extend from a package (coating material) of the lithium ion secondary battery to the exterior and are exposed, and the exposed portions are used as a substantial electrode for establishing an electrical connection between the lithium ion secondary battery and the exterior.

Thus, the protection circuit can be provided within the package of the lithium ion secondary battery by soldering the metal plates 11 and 13 to the printed wiring board 100 of the protection circuit.

Figure 12:
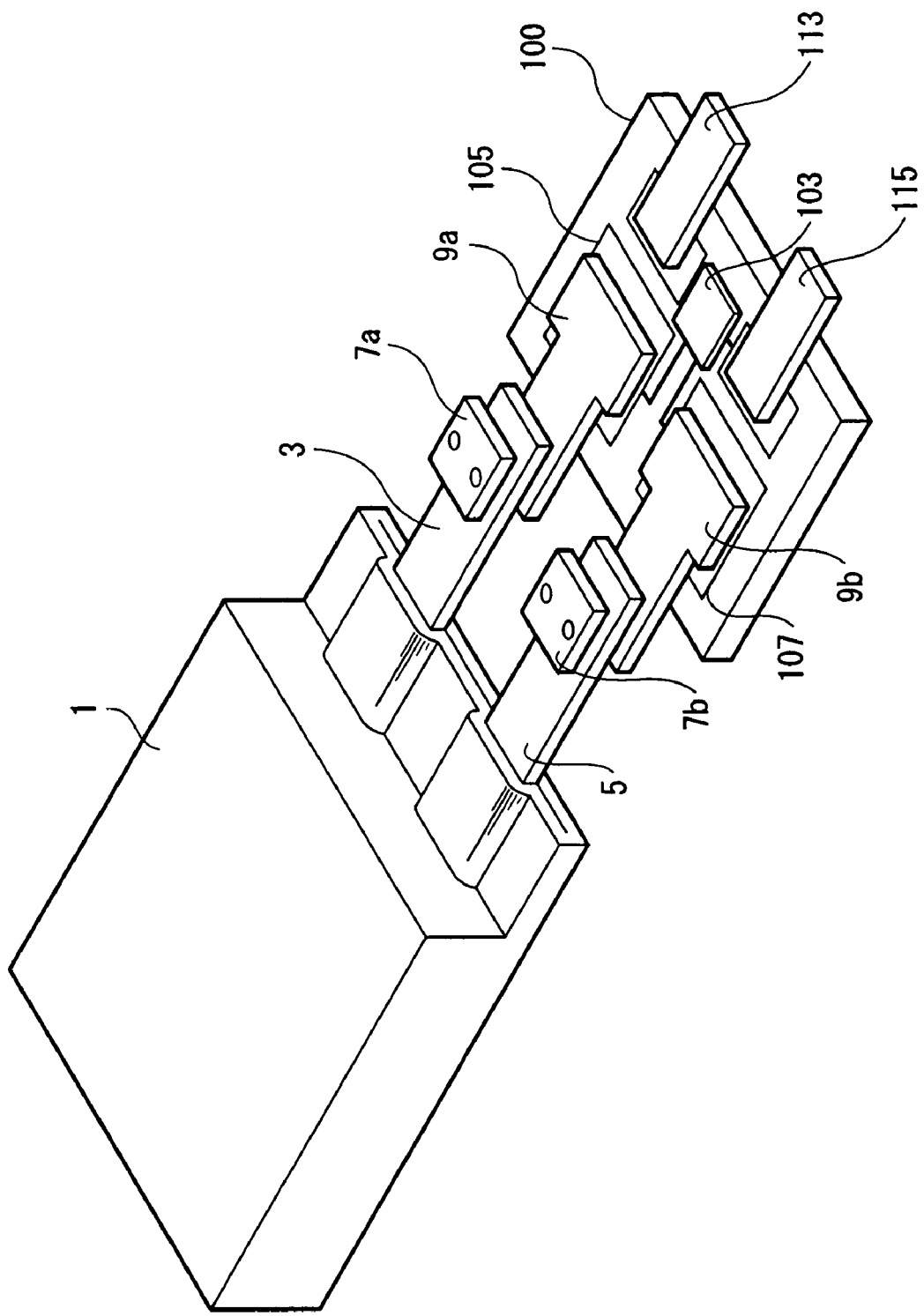
FIG. 12 is a view showing a schematic structure where the printed wiring board as a protection circuit is incorporated in the lithium ion secondary battery with the structure where the upper metal plate and the lower metal plate are welded to the electrode.

Here, also in the lithium ion secondary battery with the structure having the upper metal plate 7a and the lower metal plate 9a welded to the pole/terminal of positive electrode 3 as described in the first embodiment, the protection circuit can be provided within the package of the lithium ion secondary battery, for example, by soldering the lower metal plates 9a and 9b to the printed wiring board 100 of the protection circuit as shown in FIG. 12.

Fifth Embodiment

Figure 13:
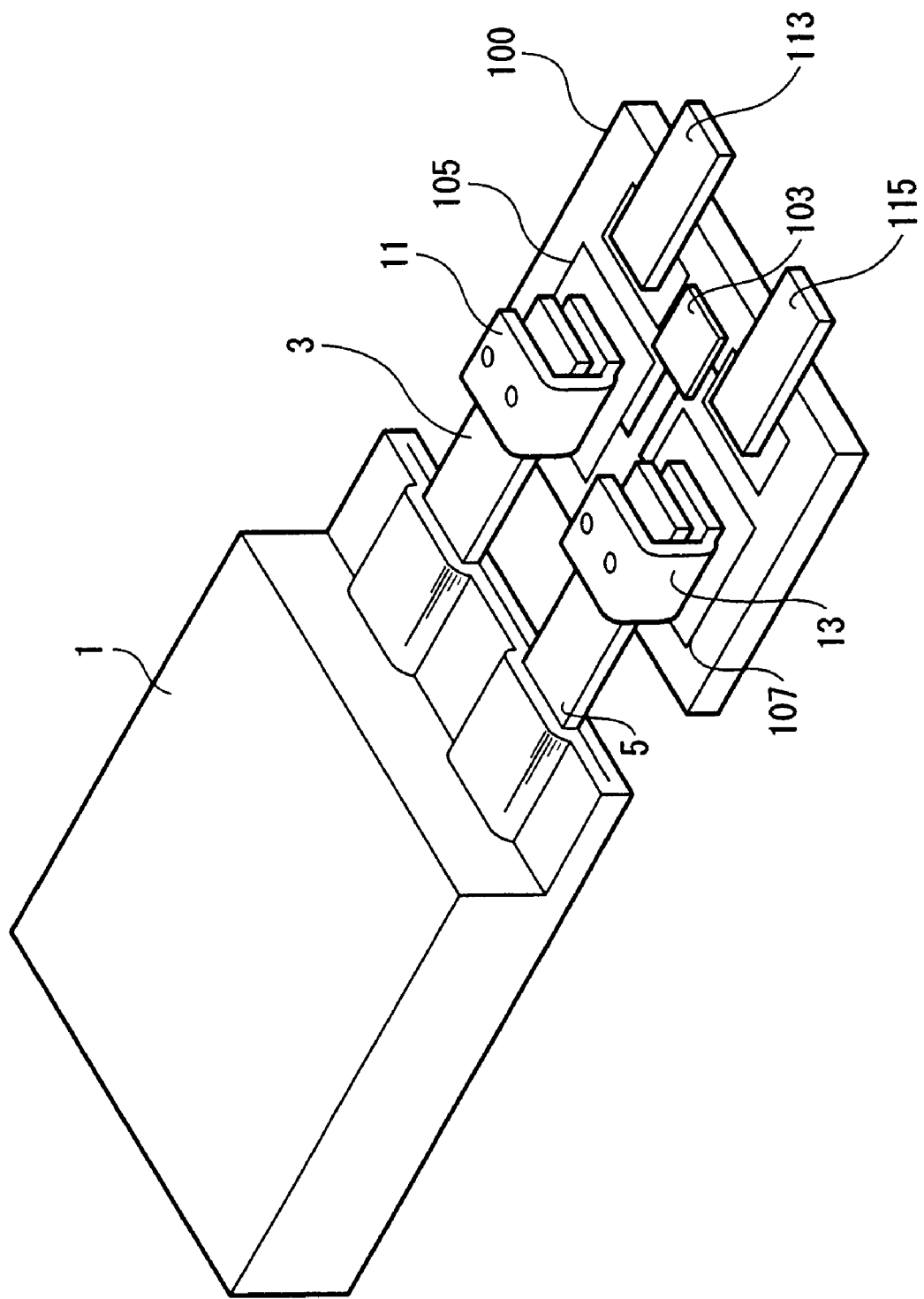
FIG. 13 is a view showing a schematic structure of a lithium ion secondary battery according to a fifth embodiment of the invention.

FIG. 13 shows a schematic structure of a lithium ion secondary battery according to a fifth embodiment of the invention.

The lithium ion secondary battery comprises metal plates 11 and 13 with a tip portion bent and converted into a horseshoe shape which are welded respectively to the pole/terminal of positive electrode 3 and the pole/terminal of negative electrode 5 as described in the second embodiment, and is manufactured by the steps of pre-soldering these metal plates 11 and 13 to a printed wiring board 100 of the protection circuit, sandwiching the pole/terminal of positive electrode 3 and the pole/terminal of negative electrode 5 respectively inside the metal plates, contacting the pole bolts 202a and 202b from the upper and lower sides, and welding the pole/terminal of positive electrode 3 and the metal plate 11, and welding the pole/terminal of negative electrode 5 and the metal plate 13, with the electric resistance welding process.

Figure 15:
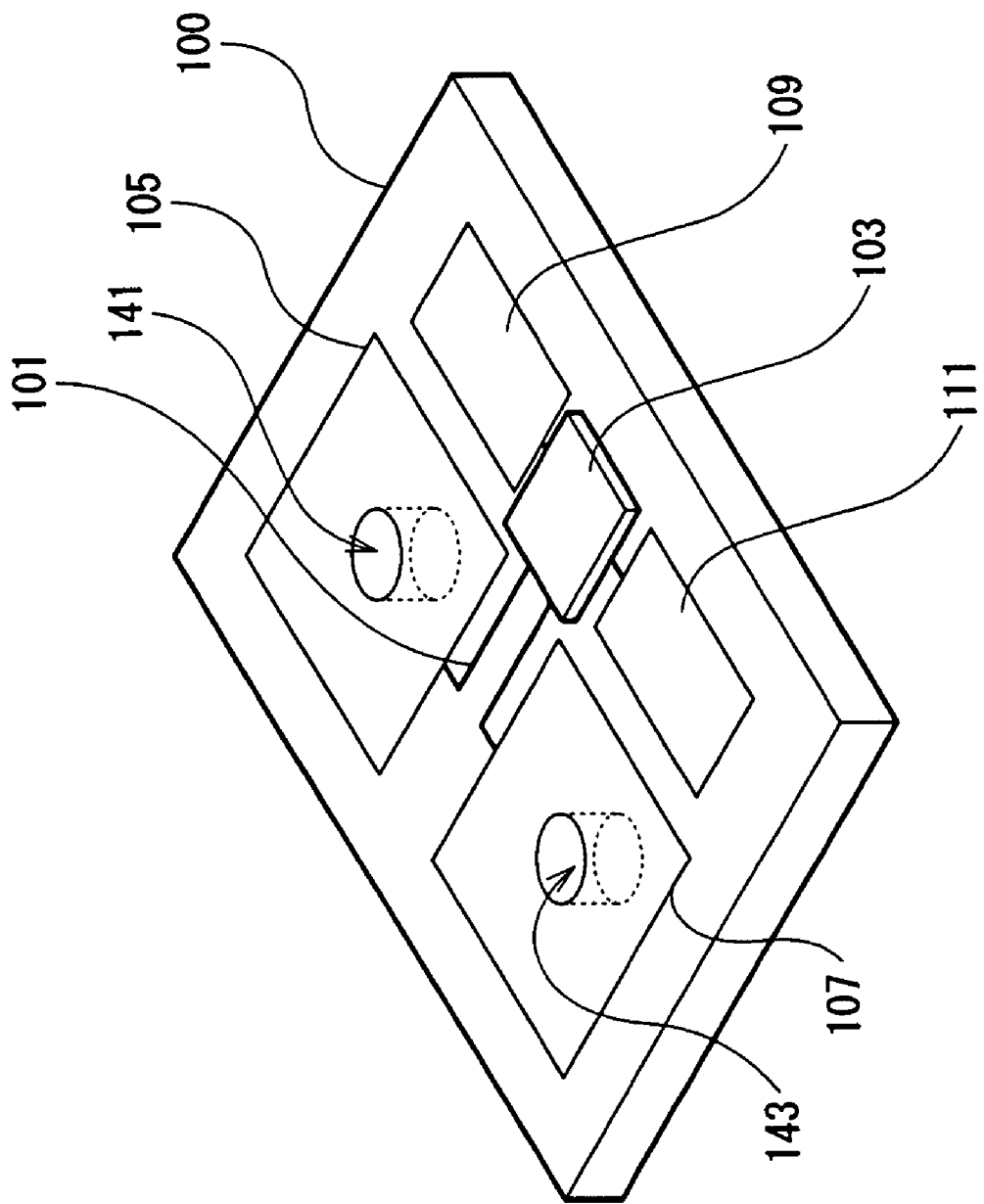
FIG. 15 is a view showing the printed wiring board with a land for positive pole/terminal of metal plate connection and a land for negative pole/terminal of metal plate connection which are respectively drilled to form a through hole.

As shown in FIG. 15, through holes 141 and 143 are formed by drilling respectively in a land 105 for positive pole/terminal of metal plate connection and a land 107 for negative pole/terminal of metal plate connection of the printed wiring board 100.

The metal plate 11 on the positive pole/terminal can be soldered or the like, to the land 105 for positive pole/terminal of metal plate connection located on the surface of the printed wiring board 100 by the reflow method. For example, it is possible to previously apply the so-called cream solder to the surface, to which a copper foil or the same with a solder coating is adhered, of 5 mm square land 105 for positive pole/terminal of metal plate connection, locate the metal plate 11 on the positive pole/terminal thereon, heat to about 230° C. by the reflow oven, and solder the metal plate 11 on the positive pole/terminal to the surface of the land 105 for positive pole/terminal of metal plate connection. Moreover, the metal plate 13 on the negative pole/terminal can also be soldered to the surface of the land 107 for negative pole/terminal of metal plate connection by the same technique.

Figure 14:
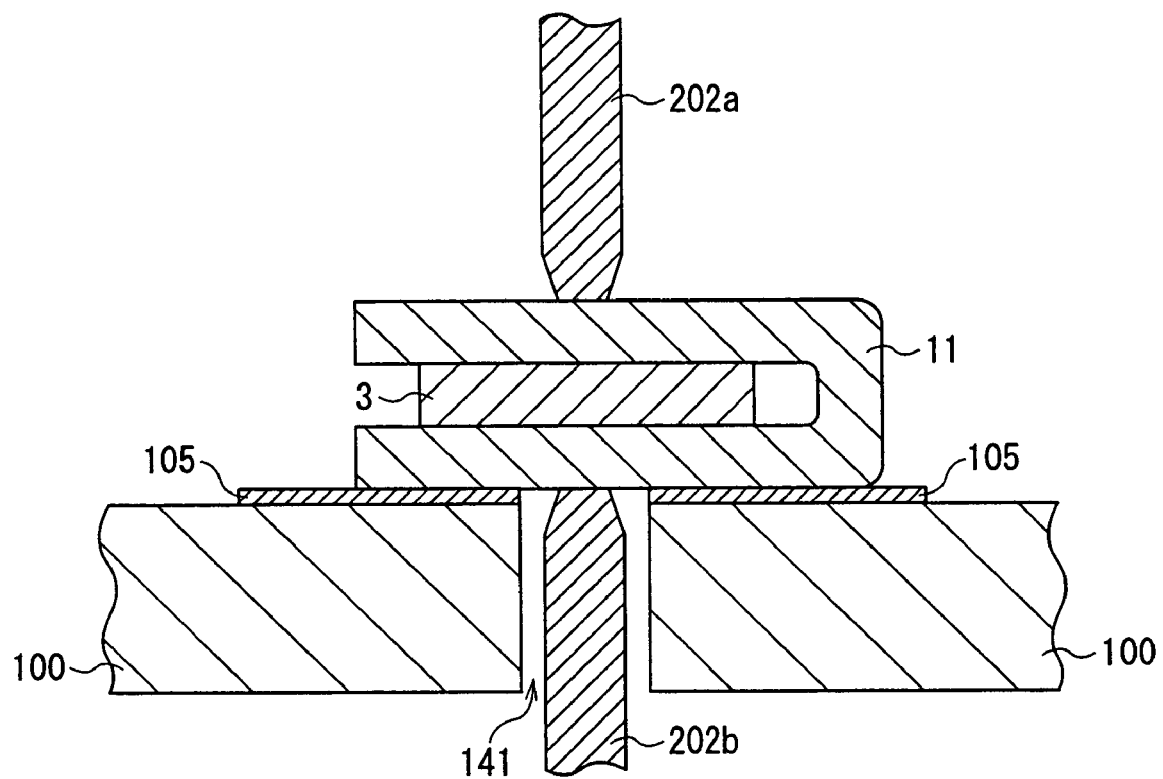
FIG. 14 is a view showing the state of welding a metal plate on the positive pole/terminal, which is pre-mounted on the surface of a printed wiring board, and a pole/terminal of positive electrode by means of the electric resistance welding process.

In this way, when the electric resistance welding is performed between the metal plate 11 on the positive pole/terminal pre-mounted to the surface of the printed wiring board 100 and the pole/terminal of positive electrode 3, the lower pole bolt 202b is in contact to the lower board of the metal plate 11 via the through hole 141 pre-formed by drilling the printed wiring board 100, and the upper pole bolt 202a is in contact to the upper board of the metal plate 11, as shown in FIG. 14. And a predetermined voltage is applied between these two pole bolts 202a and 202b, the electric current is produced to pass from the upper pole bolt 202a to the lower pole bolt 202b through the upper board of the metal plate 11, the pole/terminal of positive electrode 3, and the lower board of the metal plate 11 in this order, and therefore, the sure welding between the metal plate 11 and the pole/terminal of positive electrode 3 can be accomplished. Moreover, when the number of times of the electric resistance welding is set to one time, the number of the weld parts of the pole/terminal of positive electrode 3 and the metal plate 11 can be reduced from two to one. Therefore, the area of the metal plate 11 required for the welding can become smaller and the horseshoe shaped metal plate 11 can be miniaturized more, and thus, it is also possible to further miniaturize the outline dimension of the whole lithium ion secondary battery. In addition, it is possible to perform the electric resistance welding of the metal plate 13 on the negative pole/terminal and the pole/terminal of negative electrode 5 by the same technique as the above.

Figure 16:
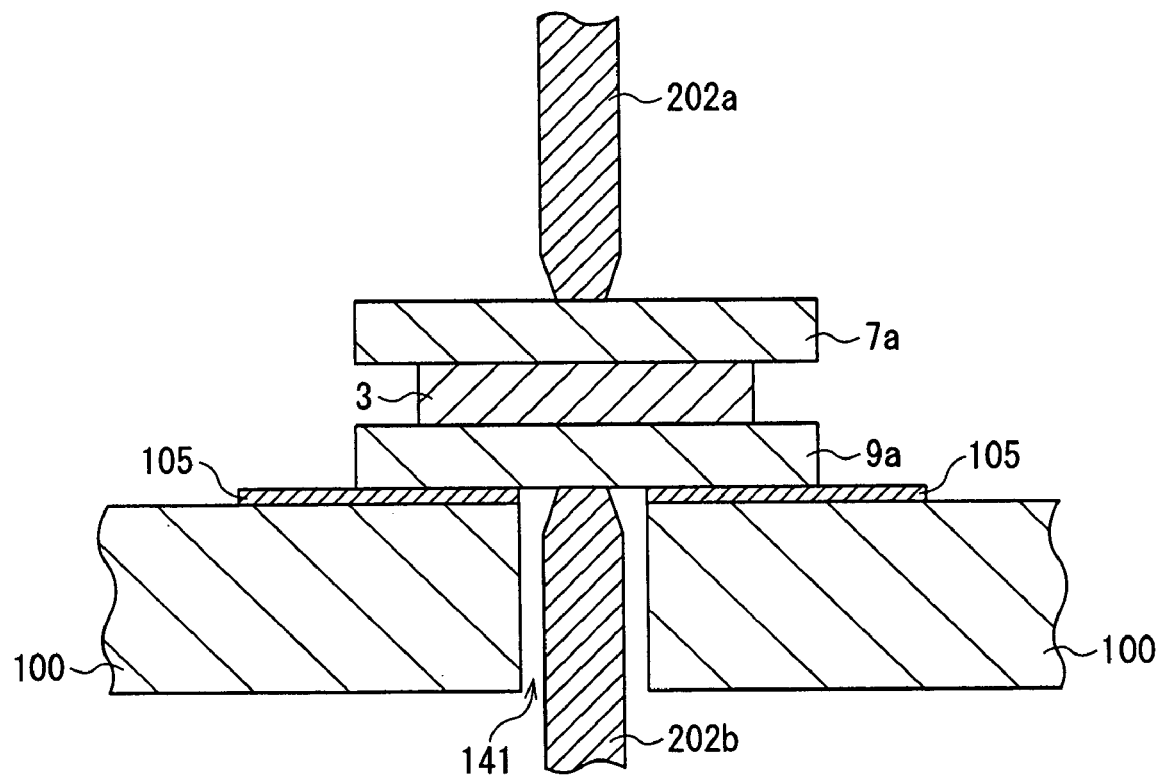
FIG. 16 is a view showing the state of welding a lower metal plate on the positive pole/terminal which is pre-mounted on the surface of a printed wiring board, a pole/terminal of positive electrode, and a upper metal plate by means of the electric resistance welding process.
Figure 17:
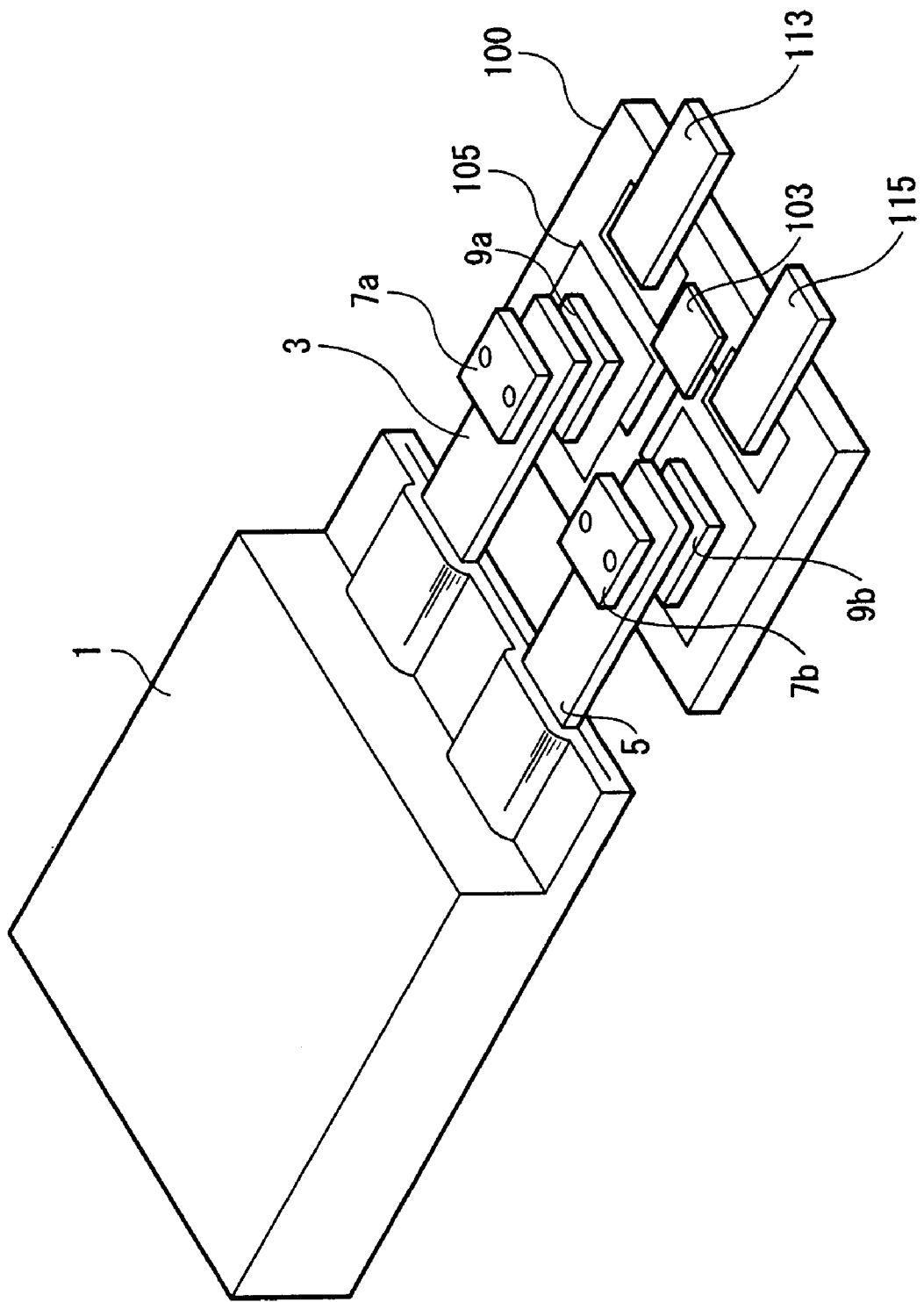
FIG. 17 is a view showing a schematic structure of a lithium ion secondary battery obtained via the step of the electric resistance welding using the technique shown in FIG. 16.

Here, the structure and the electric resistance welding technique as described above are applicable to the lithium ion secondary battery with the structure in which the upper metal plates 7a and 7b and the lower metal plate 9a are also welded to the pole/terminal of positive electrode 3 as described in the first embodiment. For example, as shown in FIG. 16, the lower metal plate 9a is previously soldered to the land 105 for positive pole/terminal of metal plate connection of the printed wiring board 100 of the protection circuit, and the lower pole bolt 202b is in contact to the lower metal plate 9a through the through hole 141 pre-formed in the printed wiring board 100 by drilling, the upper pole bolt 202a is in contact to the upper metal plate 7a, and a predetermined electric current is applied to the upper and lower pole bolts 202a and 202b. Thereby, the welding of the upper metal plate 7a and the pole/terminal of positive electrode 3 and the welding of the lower metal plate 9a and the pole/terminal of positive electrode 3 can be ensured, and the lithium ion secondary battery with the schematic elements as shown in FIG. 17 can be manufactured.

In addition, when a comparatively thick nickel layer (which is not shown), for example, with a thickness of 15-500 μm is formed on the surface of the land 105 for positive pole/terminal of metal plate connection of the printed wiring board 100 having the above through holes by the plating method or the like, the lower metal plate 9a can also be omitted by using the nickel layer instead of lower metal plate 9a, and as a result, further simplification of the structure can be accomplished. In this case, after or before forming the nickel layer, it is preferable to form a state of the so-called blind hole by embedding an excellent conductive metal material such as copper, a solder, or the like in the through hole 141 by electroless plating, solder plating, or the like. The metal material embedded in the through hole 141 can seal the hole of the nickel layer on the surface of the printed wiring board 100 to prevent the dissolved aluminum base alloy of the pole/terminal of positive electrode 3 from spilling out, and the electric current can be produced through the metal material embedded in the through hole 141 between the undersurface of the printed wiring board 100 and the nickel layer on the surface (the upper surface).

In this way, also when the nickel layer is used instead of the lower metal plate 9a or 9b, and the metal material is embedded in the through hole 141 or 143, it is possible to surely perform the positive electric resistance welding by the electric resistance welder as shown in FIGS. 2 and 5.

Sixth Embodiment

Figure 18:
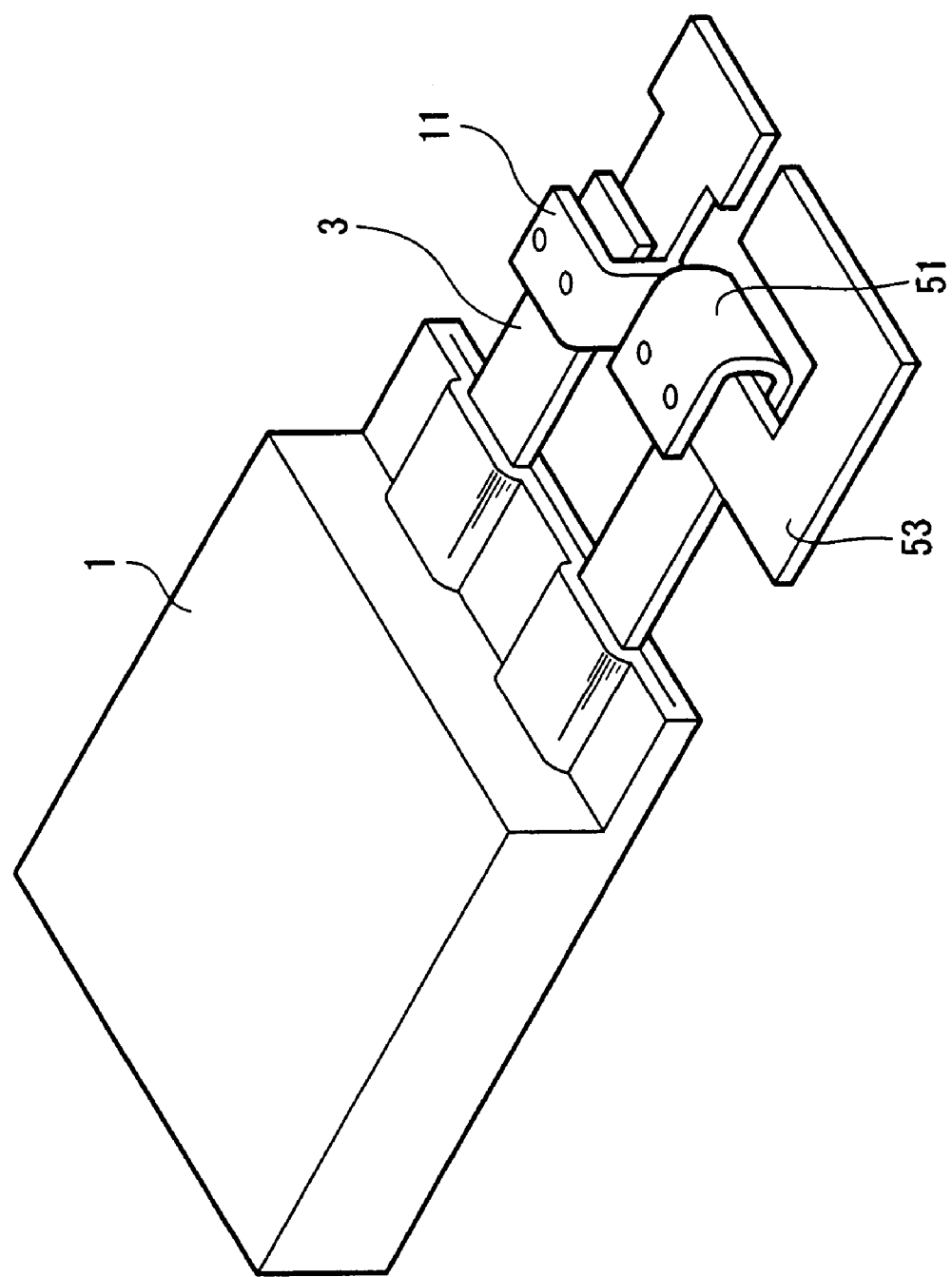
FIG. 18 is a view showing a schematic structure of a lithium ion secondary battery according to a sixth embodiment of the invention.

FIG. 18 shows a schematic structure of a lithium ion secondary battery according to a sixth embodiment of the invention.

In the lithium ion secondary battery, the pole/terminal of positive electrode 3 made of the aluminum base alloy is welded to the horseshoe shaped metal plate 11 to be sandwiched inside, as well as one described in the second embodiment.

On the other hand, a pole/terminal of negative electrode 51 made of a nickel base alloy is bent and converted into a form in which a tip portion is mostly folded to an approximately horseshoe shape, and a metal plate 53 on the negative pole/terminal made of an aluminum base alloy is welded to the tip portion with the horseshoe shape of the pole/terminal of negative electrode 51 to be sandwiched inside. It is also possible to perform the electric resistance welding of the metal plate 53 on the negative pole/terminal and the pole/terminal of negative electrode 51, or the like, in such structure. The electric resistance welding in the above case can be performed by the application of the same technique as described in each of the above embodiments. That is, the metal plate 53 on the negative pole/terminal made of the aluminum base alloy with a low melting point is welded from above and below to be sandwiched inside the tip portion shaped into the horseshoe of the pole/terminal of negative electrode 51 with a high melting point by the electric resistance welding process. Thus, even if the aluminum base alloy of the metal plate 53 on the negative pole/terminal completely dissolves in the thickness direction, the pole/terminal of negative electrode 51 with a high melting point can prevent the meltage from spilling out to the exterior, scattering, or the like. Here, as the metal plate 53 on the negative pole/terminal, for example, a plate made of aluminum, an aluminum base alloy, copper, a copper base alloy, silver, a silver base alloy, or the like, a plate made of the same nickel base alloy as the pole/terminal of negative electrode 51, especially which is thicker than the pole/terminal of negative electrode 51, or the like, can be applicable.

Figure 19A:
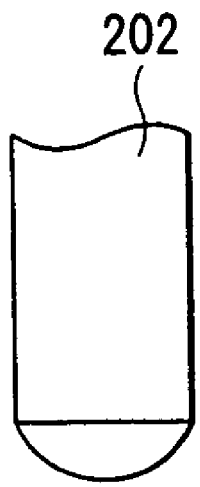
FIGS. 19A to 19F are views showing variations of a welding rod applicable to the electric resistance welding.
Figure 19B:
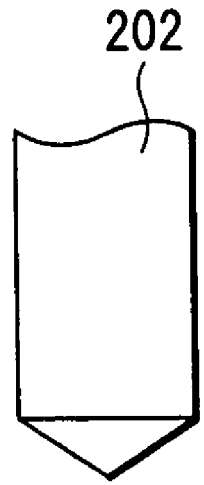
Figure 19C:
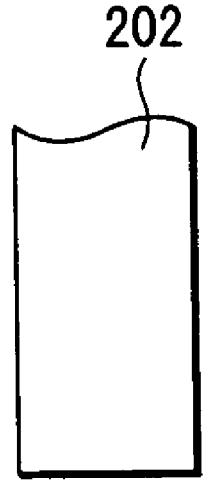
Figure 19D:
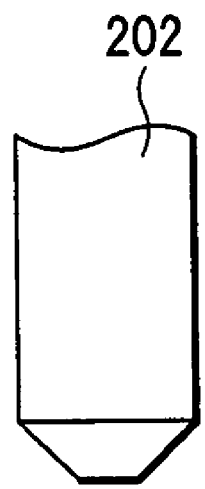
Figure 19E:
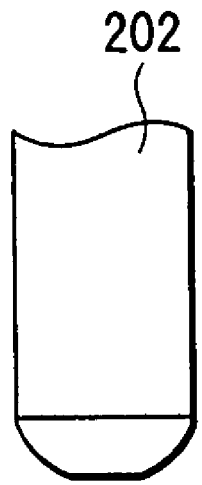
Figure 19F:
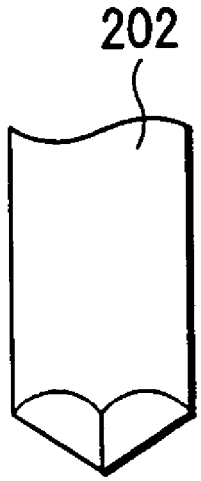

In addition, the welding rods 202 (202a, 202b) requires hardness, conductivity, and thermal conductivity, and are composed, for example, of a copper alloy such as a chromium-copper, alumina scattering strengthened copper, or the like. The tip form of the welding rods 202 is preferably, for example, a half sphere form as shown in FIG. 19A, a cone form as shown in FIG. 19B, a cylinder form as shown in FIG. 19C, a trapezoid form obtained by flatly cutting the tip of a cone as shown in FIG. 19D, a form combining a half sphere with a tip being cut flatly and a plane as shown in FIG. 19E, or a multi pyramid form such as quadrangular pyramid form (pyramid form) as shown in FIG. 19F.

Especially, the half sphere form is the most preferable tip form of the welding rods 202. With this form, a high pressure is applied to the central part of the tip of the welding rod 202 and a welding current concentrates and flows when the welding rod 202 is pressed against an object being welded, and thus the temperature rises in a very small range thereof, the object being welded is dissolved to easily form an alloy layer. Moreover, since the place in which the alloy layer is formed, is surely fixed to the center of the welding rod 202, the distance between the two weld parts through which the welding electric current flows is fixed, and the welding conditions stabilizes, which is preferable. Furthermore, the pressure at the time of pressing the welding rod 202 against the object being welded becomes weaker from the center of the welding rod 202 toward the circumference, and thus, even if the object being welded dissolves in the central part of the welding rod 202, the peripheral part thereof does not completely dissolve, and a hole is difficult to form in the object being welded. Here, the welding current becomes weaker from the center of the welding rod 202 toward the circumference in proportion to the pressure.

The effective half sphere-like tip has a form in which a cylinder diameter is 0.5 mm-10 mm and a radius of the half sphere of the tip is 0.5 mm-5 mm, for example. The optimal half sphere-like tip has a form in which the diameter of the cylinder located at 10 mm upward from the tip of the welding rod 202 is 3 mm, the diameter of the cylinder located at 1 mm upward from the tip of the welding rod 202 is 1.5 mm, and the radius of the half sphere of the tip is 1.5 mm.

The cone form provides the almost same actions as the half sphere form, and is a comparatively preferable tip form. The tip angle of the cone is preferably a obtuse angle of 140 degrees-175 degrees, and the diameter of the cylinder is preferably 0.5 mm-5 mm. The optimal cone-like tip has a form in which the diameter of the cylinder located at 10 mm upward from the tip of the welding rod 202 is 3 mm, the diameter of the cylinder located at 1 mm upward from the tip of the welding rod 202 is 1.5 mm, and the angle of the tip cone is 170 degrees. If the angle of the tip is set to the acute angle of 90 degrees or less, a high pressure may be applied to the central part, and the object being welded may be pierced, or the area through which the welding current flows may become small, which is not preferable. In addition, the multi pyramid form is the same as the cone form.

Although the cylinder form is the most general form, for example, for welding nickel plates, the electric current value for the welding varies, and therefore, the welding strength also tends to vary and the poor welding may occur at a certain rate. For example, a high pressure is applied to a certain smaller portion in the circular of the tip of the welding rod 202 and the welding current flows there, when the welding rod 202 is pressed against the object being welded for the electric resistance welding, so the place of the weld part moves accidentally for every welding, corresponding to the oxidation state and the degradation state of the tip of the welding rod 202, the state of the pedestal, or the surface state of the object being welded. Therefore, the distance between the two weld parts cannot be kept constant, the values of the resistance and the electric current between the two welding rods 202 change, the temperature of the weld parts changes, and the welding strength changes, which is not preferable. Furthermore, if the voltage or the electric current for the welding is increased, the object being welded may be dissolved completely and a hole may open. However, since the area of the tip portion is larger than that of the half sphere form, the alloy layer may be formed in a larger area. Moreover, there are advantages of an easier polish operation after repeating the utilization for the welding and the cheap operation cost.

The trapezoid form obtained by flatly cutting the tip of the cone, or the form obtained by flatly cutting the tip of the semicircle, similarly acts as well as the half sphere form, and is comparatively excellent tip form. Moreover, the area to which a high pressure is applied, is larger compared to the half sphere form, and the alloy layer may be formed in a larger area. However, if the voltage or the electric current for the welding is considerably increased, the object being welded may be dissolved completely, a hole may open, which is not preferable.

Seventh Embodiment

Figure 20:
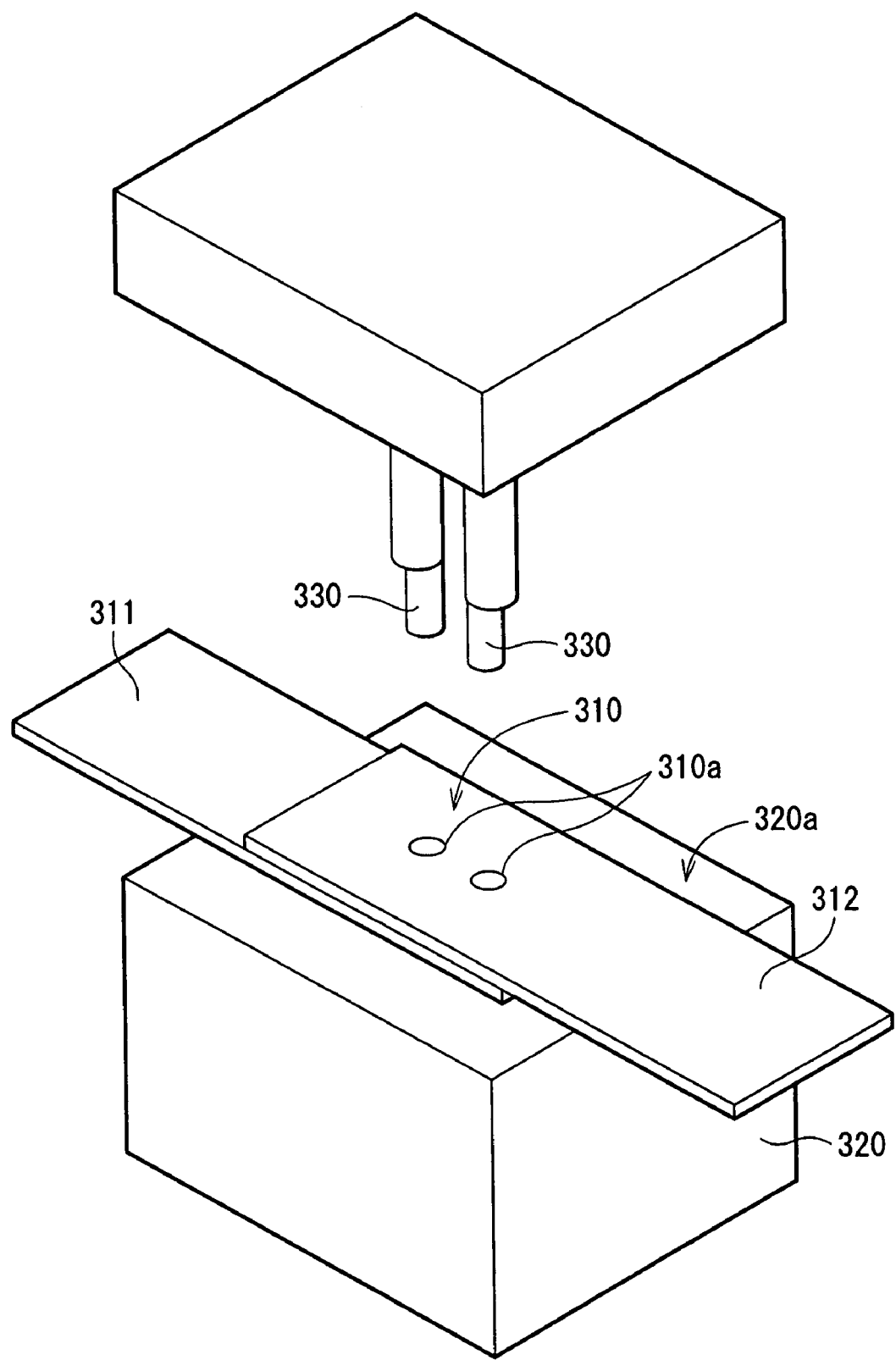
FIG. 20 is a perspective view showing a method of manufacturing a weldment according to a seventh embodiment of the invention, and a welding device used for the same.

FIG. 20 shows a method of manufacturing a weldment according to a seventh embodiment of the invention, and a welding device used for the method. And in the embodiment, the case where an aluminum plate 311 made of a different material as objects 310 being welded, and a nickel plate 312 are welded, will be described. Here, the aluminum plate 311 may be an aluminum base alloy plate containing aluminum, and the nickel plate 312 may be a nickel base alloy plate containing nickel.

The welding device comprises a pedestal 320 for placing the objects 310 being welded, and a pair of welding rods 330 for pressing against the objects 310 being welded and producing an electric current through the objects 310 being welded. The welding rods 330 are connected to an electric welding control device which is not shown, so the conditions for welding the objects 310 being welded can be set.

Preferably, in the pedestal 320, at least a placing surface 320a thereof for placing the objects 310 being welded is composed of a refractory metal with a melting point higher than those of the objects 310 being welded. The reason thereof is that the higher melting point can prevent the pedestal 320 from dissolving with the objects 310 being welded, and the objects 310 being welded from adhering to the pedestal 320, in the welding. Other reasons are that the heat release effect can be expected because of high thermal conductivity of the metal, and the excessive dissolution and the ebullition of the aluminum plate 311 can be prevented., And other reasons are that the welding current can flow also through the pedestal 320, and the higher welding current can be produced through weld parts 310a of the objects 310 being welded, because of the conductivity of the metal.

In the embodiment, the melting point of the aluminum plate which is the object being welded is 660° C., and the melting point of the nickel plate is 1455° C., so at least the placing surface 320a is preferably composed of the refractory metal with the melting point higher than 1455° C. which is the melting point of the nickel plate. Furthermore, there are more effective, when the difference between the melting points of the placing surface 320a and the nickel plate is larger.

Moreover, at least the placing surface 320a of the pedestal 320 is preferably composed of the metal with 10 W/mK or more of the thermal conductivity at 700° C. Because the heat release effect cannot be expected and the excessive dissolution and ebullition of the aluminum plate 311 cannot be effectively prevented, if the thermal conductivity is too low. In addition, when the electric welding control device is small, at least the placing surface 320a the pedestal 320 is preferably composed of the metal of 200 W/mK or less of the thermal conductivity at 700° C. Because the heat may be not accumulated in the objects 310 being welded and the welding may be not performed, if the thermal conductivity is too high, in the case of small capacities of the electric current and the voltage of the electric welding control device and the maximum welding current in a range of 300 A-800 A or less. In this connection, the thermal conductivity is defined by that at 700° C., because it is thought that the portions of the placing surface 320a directly contacting to the weld parts 310a is heated to about 700° C. in the welding.

Furthermore, at least the placing surface 320a of the pedestal 320 is preferably composed of the metal with 30 μΩ cm or less of the electric volume resistivity at 100° C. The reasons thereof are that most of the welding current flows through the nickel plate 312 and the aluminum plate 311 of the positive electrode, which are lead or tab objects, in the plane direction under the too high electric volume resistivity of the placing surface 320a, a higher welding current cannot be produced in the perpendicular direction of the weld parts 310a of the objects 310 being welded, and the weld parts 310a cannot fully be heated. And, other reasons are that about 20-70% of the welding current flow in the direction of a plane connecting the two weld parts 310a of the above aluminum plate 311, the temperature of an aluminum plate 311 becomes higher, the weld parts 310a of the aluminum plate 311 dissolve too much, and a hole may be formed, under the too high electric volume resistivity of the placing surface 320a. That is, it is more preferable to lower the heating value of the aluminum plate 311. In this connection, the electric volume resistivity is defined by that at 100° C., because it is thought that the portion near the weld parts 310a of the placing surface 320a through which the welding current flows is heated to about 100° C. in the welding.

The metal composing at least the placing surface 320a preferably contains at least one kind selected from the group consisting of platinum (Pt), iron (Fe), chromium (Cr), zirconium (Zr), titanium (Ti), molybdenum (Mo), palladium (Pd), tungsten (W), and iridium (Ir). In the specification, the concept of the metal is wide and also includes an alloy. The physical properties thereof (a melting point, thermal conductivity at 700° C., and electric volume resistivity at 100° C.) are shown in Table 1.

The pedestal 320 preferably has a thickness (which is the thickness in the perpendicular direction to the placing surface 320a) of 1 mm or more, when the whole pedestal 320 is composed of such metal described above. The reasons are that the sufficient heat release effect cannot be acquired, and the resistance value between the weld parts of the pedestal 320 is higher if the pedestal is too thin, and thus, enough high welding current cannot be produced, and furthermore, the pedestal 320 is deformed due to the pressure of the welding rod 330.

Figure 21:
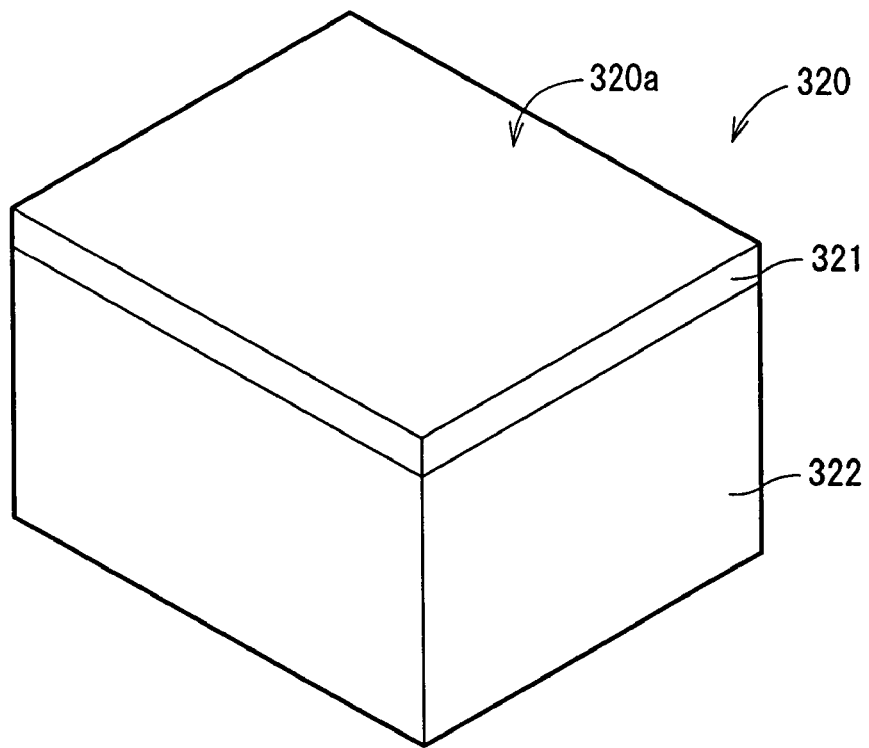
FIG. 21 is a perspective view showing a modification of the welding device shown in FIG. 20.

In addition, the whole pedestal 320 may be composed of the metal as described above, while the pedestal 320 may be composed to have a placing part 321 composed of the metal as described above and a heat release part 322 with a higher thermal conductivity than the placing part 321 as shown in FIG. 21. The reasons are that the adhesion of the objects 310 being welded can be prevented because of the placing part 321 composed of the refractory metal, the heat release of weld parts 310a can be promoted by the heat release part 322, and the excessive dissolution of the aluminum plate 311 can be more effectively prevented, when the pedestal 320 is composed to have the placing part 321 and the heat release part 322, although it is easier to fabricate the whole pedestal 320 to be composed of a single metal. Another reason is that most of the metals as described above are expensive, and the advantage of decreasing the cost of the pedestal 320 can also be obtained, when only the placing part 321 is composed of such metal. Furthermore, the reason is that the heat release part 322 can be reused by exchanging only the placing part 321, if the placing part 321 becomes rough or degrades due to performing the electric resistance welding repeatedly. Therefore, the pedestal 320 having the placing part 321 and the heat release part 322 as shown in FIG. 21 can prevent the dissolution in the contact portion of the objects 310 being welded, and can radiate heat to the maximum extent, so it is preferable.

Specifically, a material composing the heat release part 322 is preferably a metal containing at least one kind selected from the group consisting of silver (Ag), copper (Cu), aluminum (Al), and gold (Au). The thermal conductivities thereof at 100° C. are shown in Table 2. The thermal conductivities at 100° C. are shown because it is thought that the temperature of the heat release part 322 is about 100° C. in the welding. In addition, the thermal conductivity of platinum is 72 W/mK at 100° C.

The thickness of the placing part 321 is preferably about 0.5 mm-2 mm, and more preferably about 1 mm. The reasons is that the placing part 321 is deformed due to the pressure of the welding rod 330 and the heat release part 322 dissolves and is deformed, if the thickness is too thin, and the heat release effect may decrease, the welding strength may decrease slightly, and the cost of the pedestal 320 also increases, if it is too thick. The thickness of the heat release part 322 is preferably 5 mm or more, for example. Because the sufficient cooling effect cannot be obtained, the temperature of the pedestal 320 itself is also brought to a high temperature to be oxidized and degraded, if the thickness is too thin.

The placing part 321 and the heat release part 322 are smoothed by the mirror finish so that the joint surface may not be rough, and then are joined by applying the pressure by a screw, or support attachments located above and below, or the like, to have mechanical adhesion, for example. In addition, the placing part 321 may simply be put on the heat release part 322. Because several kg or more of power is applied to thermally join the placing part 321 and the heat release part 322 in the direction of adhesion in the electric resistance welding. Alternatively, the placing part 321 and the heat release part 322 may be welded and joined with applying several Mg or more of quite high pressure from the upper and lower sides. It should be noticed that the mechanical joint is preferable, because it is easier to replace the placing part 321, and the stability and the adhesion are also excellent.

Figure 22:
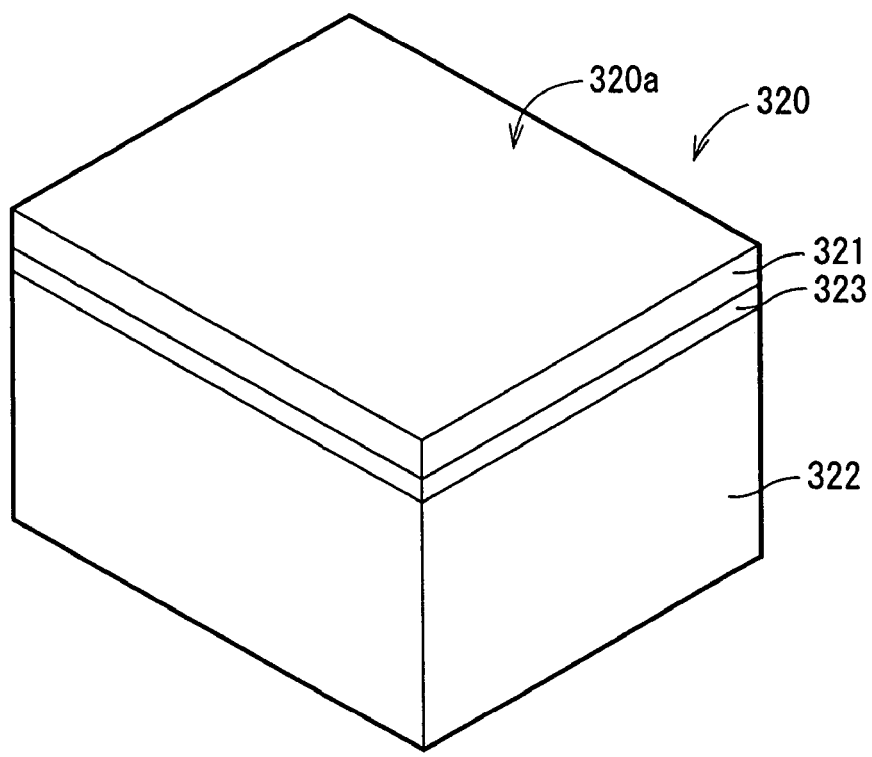
FIG. 22 is a perspective view showing a modification of the welding device shown in FIG. 21.

When mechanically joining the placing part 321 and the heat release part 322, an adherence layer 323 made of a silicon adhesive, silicon oil, a thermally conductive sheet, or the like may interpose between the placing part 321 and the heat release part 322, as shown in FIG. 22. In this way, the adhesion between the placing part 321 and the heat release part 322 can be maintained easily and the heat release property can be improved more, so it is preferable.

Alternatively, the placing part 321 and the heat release part 322 may be joined by the brazing. In this way, although the simplicity of replacing the placing part 321 is inferior, the adhesion of the placing part 321 and the heat release part 322 is excellent, heat release property is excellent, and furthermore it is possible to easily fabricate thereof, so it is preferable. The material for the brazing may include a silver wax containing silver, a solder containing lead, or a lead free solder containing copper, for example. It should be noticed that the utilization of the solder containing lead causes the slight reduction of the heat.

Figure 23A:
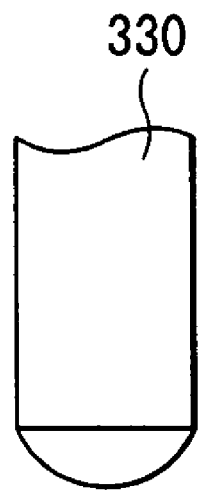
FIGS. 23A to 23F are a elevational view showing a tip form of the welding rod in the welding device shown in FIG. 20
Figure 23B:
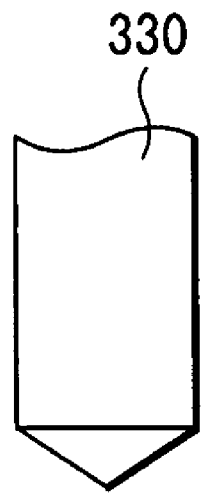
Figure 23C:
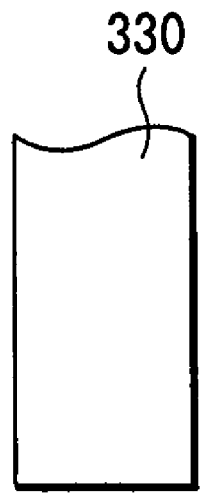
Figure 23D:
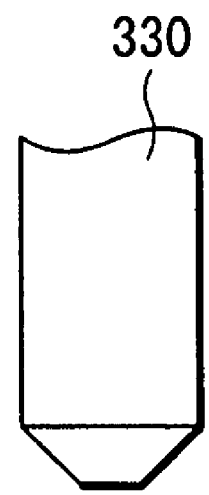
Figure 23E:
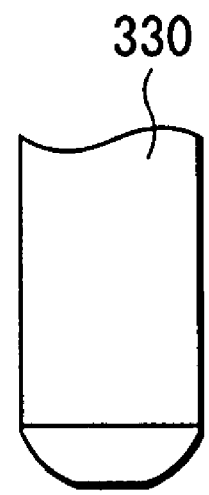
Figure 23F:
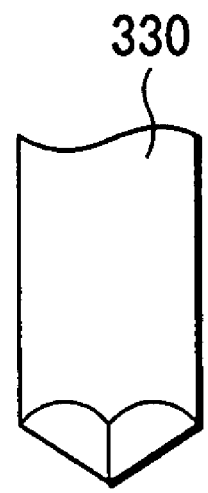

The welding rods 330 require high hardness, high conductivity, and high thermal conductivity, and are composed, for example, of a copper alloy such as chromium-copper or alumina scattering strengthened copper. The tip form of the welding rods 330 is preferably, for example, a half sphere form as shown in FIG. 23A, a cone form as shown in FIG. 23B, a cylinder form as shown in FIG. 23C, a trapezoid form obtained by flatly cutting the tip of a cone as shown in FIG. 23D, a form combining a half sphere with a tip being cut flatly and a plane as shown in FIG. 23E, or a multi pyramid form such as quadrangular pyramid form (pyramid form) as shown in FIG. 23F.

Especially, the half sphere form is the most preferable tip form of the welding rods 330. With this form, a high pressure is applied to the central part of the tip of the welding rod 330 and a welding current concentrates and flows when the welding rod 330 is pressed against the objects 310 being welded, and thus the temperature increases in a very small range thereof, the objects 310 being welded are dissolved to easily form an alloy layer. Moreover, since the place in which the alloy layer is formed is surely fixed to the center of the welding rod 330, the distance between the two weld parts 310a through which the welding current flows, is fixed, and the welding conditions stabilizes, which is preferable. Furthermore, the pressure at the time of pressing the welding rod 330 against the objects 310 being welded, becomes weaker from the center of the welding rod 330 toward the circumference, and thus, even if the objects 310 being welded dissolve in the central part of the welding rod 330, the peripheral part thereof does not completely dissolve, and a hole is difficult to form in the objects 310 being welded. Here, the welding current becomes weaker from the center of the welding rod 330 toward the circumference in proportion to the pressure.

The effective half sphere-like tip has a form in which a cylinder diameter is 0.5 mm-10 mm and a radius of the half sphere of the tip is 0.5 mm-5 mm, for example. The optimal half sphere-like tip has a form in which the diameter of the cylinder located at 10 mm upward from the tip of the welding rod 330 is 3 mm, the diameter of the cylinder located at 1 mm upward from the tip of the welding rod 330 is 1.5 mm, and the radius of the half sphere of the tip is 1.5 mm.

The cone form provides the almost same actions as the half sphere form, and is a comparatively preferable tip form. The tip angle of the cone is preferably a obtuse angle of 140 degrees-175 degrees, and the diameter of the cylinder is preferably 0.5 mm-5 mm. The optimal cone-like tip has a form in which the diameter of the cylinder located at 10 mm upward from the tip of the welding rod 330 is 3 mm, the diameter of the cylinder located at 1 mm upward from the tip of the welding rod 330 is 1.5 mm, and the angle of the tip cone is 170 degrees. If the angle of the tip is set to the acute angle of 90 degrees or less, a high pressure may be applied to the central part, and the objects 310 being welded may be pierced, or the area through which the welding current flows may become small, which is not preferable. In addition, the multi pyramid form is the same as the cone form.

Although the cylinder form is the most general form, for example, for welding nickel plates, the electric current value for the welding varies, and therefore, the welding strength also tends to vary and the poor welding may occur at a certain rate. For example, a high pressure is applied to a certain smaller portion in the circular of the tip of the welding rod 330 and the welding current flows there, when the welding rod 330 is pressed against the objects 310 being welded in the electric resistance welding, so the place of the weld part moves accidentally for every welding corresponding to the oxidation state and the degradation state of the tip of the welding rod 330, the state of the pedestal 320, or the surface state of the objects 310 being welded. Therefore, the distance between the two weld parts 310a cannot be kept constant, the values of the resistance and the electric current between the two welding rods 330 change, the temperature of the weld parts 310a changes, and the welding strength changes, which is not preferable. Furthermore, if the voltage or the electric current for the welding is increased, the objects 310 being welded may be dissolved completely and a hole may open. However, since the area of the tip portion is larger than that of the half sphere form, the alloy layer may be formed in a larger area. Moreover, there are advantages of an easier polish operation after repeating the utilization for the welding and the cheap operation cost.

The trapezoid form obtained by flatly cutting the tip of the cone, or the form obtained by flatly cutting the tip of the semicircle, similarly acts as well as the half sphere form, and is comparatively excellent tip form. Moreover, the area to which a high pressure is applied is larger compared to the half sphere form, and the alloy layer may be formed in a larger area. However, if the voltage or the electric current for the welding is considerably increased, the objects 310 being welded may be dissolved completely, a hole may open, which is not preferable.

In the embodiment, the aluminum plate and the nickel plate are welded as follows using such a welding device.

First, the aluminum plate 311 and the nickel plate 312 are overlapped on the placing surface 320a of the pedestal 320. The aluminum plate 311, i.e., the plate with a lower melting point, is directed to the pedestal side in this case. Because the excess melting can be prevented with the heat release effect of the pedestal 320. Subsequently, a pair of the welding rods 330 is moved below to push the nickel plate 312 from the upper part with the prescribed weight. At this time, in each part directly under the tips of the welding rods 330, the nickel plate 312 and the aluminum plate 311 are adhered each other with the pressure, and the aluminum plate 311 is adhered to the pedestal 320.

Then, voltage is applied to the pair of the welding rods 330 with a voltage wave or a current wave form in a pre-defined time, by the electric welding control device which is not shown. The welding current flows in the short time on the order of about tens of ms in the following order: the welding rod 330 on the plus electrode→the nickel plate 312→the aluminum plate 311→the pedestal 320→the aluminum plate 311→the nickel plate 312→the welding rod 330 on the minus electrode. Thereby, the joints between the nickel plate 312 and the aluminum plate 311 in the parts directly under the welding rods 330, i.e., the weld parts 310a, dissolve and melt together. When the welding current is stopped by the electric welding control device, the weld parts 310a is cooled quickly, and the alloy layer is formed and the welding is accomplished.

Then, the surface of the aluminum plate 311 adjacent to the pedestal 320 is cooled by the heat release effect of the pedestal 320, and is also covered with the oxide film with a high melting point, and thus is not heated to the melting point. Moreover, at least the placing surface 320a of the pedestals 320 is composed of the refractory metal with the melting point higher than those of the objects 310 being welded, and therefore is not dissolved. Therefore, an alloy layer of the pedestal 320 and the aluminum plate 311 is difficult to form. Furthermore, in the pedestal 320, the increase of the temperature is inhibited by the own heat release effect, and the oxidation due to the high temperature is prevented. In addition, when the pedestal 320 has the placing part 321 and the heat release part 322, the generated heat in the weld parts 310a is radiated more efficiently.

The voltage, the voltage application time, or the like for the welding, may be set to a value which is at least sufficient to melt the nickel plate 312. For example, the maximum voltage is set to 0.5 V-5 V, the maximum current is set to 100 A-3000

A, and the voltage application time is set to 5 ms-40 ms. As an example, the voltage is set to about 1.1 V, the electric current is set to about 1000 A, and the voltage application time is set to about 10 ms. The wave form of the applied voltage may be a direct current voltage wave form or an alternating voltage wave form. However, the direct current can produce a large electric current in a shorter time, and thus increase the temperature of the weld parts 310a quickly, so it is preferable. Therefore, the alloy layer can be formed in the weld parts 310a in such a short time as the aluminum plate 311 can be cooled. Moreover, a voltage apply control system or an electric current apply control system is sufficient as the control system. The voltage apply control system is preferable, because the heating value of the weld parts 310a remains constant, and the electric current apply control system is preferable, because a constant electric current flows even if the surface states or resistances of the objects 310 being welded, the welding rods 330, and the placing surface 320a of the pedestal 320 change, and thus the heating value of the portion in which the nickel plate 312 and the aluminum plate 311 join, remains constant.

In addition, it is preferable to do a cleaning operation of polishing the placing surface 320a of the pedestal 320 with a buff to which abrasive is applied, a grinding stone, and sandpaper for every hundreds to thousands of the welding in order to remove the oxide and the aluminum attachments on the surface of the placing surface 320a. The reasons are that the resistance of the placing surface 320a of the pedestal 320 increases, less welding current flows through the pedestal 320, and the welding strength becomes unstable. Moreover, it is preferable to do the polish operation of polishing the tips of the welding rods 330 for every thousands of the welding. For example, the metal portion which has not oxidized is exposed by the polish with the sandpaper for the oxidized tip or the degraded thin layer, or for the oxidized or degraded thick layer by the grind of about 0.2 mm or more thereof with a cutting machine such as an end mill. Furthermore, it is preferable to exchange the pedestal 320 or the placing part 321 of the pedestal 320, and the welding rods 330, with new ones for every tens of thousands or more of the welding.

Thus, according to the embodiment, at least the placing surface 320a of the pedestal 320 is composed of the refractory metal with the melting point higher than those of the objects 310 being welded, for example, the refractory metal with the melting point higher than 1455° C., and thus, the adhesion of the objects 310 being welded to the pedestal 320 can be prevented, the excessive dissolution of the objects 310 being welded can be prevented, and furthermore a high welding current can be produced through the weld parts 310a, even if the electric resistance welding is performed on the objects 310 being welded made of a different material such as the aluminum plate 311 and the nickel plate 312. Therefore, the objects 310 being welded can firmly be welded by the electric resistance welding. Moreover, since the setting range of the electric welding control device is wide, the welding strength can be stabilized also when welding in large quantities. Furthermore, since the aluminum plate 311 is welded with cooling, the aluminum is not boil and scatter around violently, the safety of the operation can be improved and furthermore the time and effort of the cleaning can be saved.

Particularly, when at least the placing surface 320a of the pedestal 320 is composed of the metal with the thermal conductivity of 10 W/mK or more at 700° C., the objects 310 being welded can be heated moderately and the excessive dissolution and boiling can effectively be prevented by radiating the heat moderately.

Moreover, when at least the placing surface 320a of the pedestal 320 is composed of the metal with the electric volume resistivity of 30 μΩ cm or less at 100° C., the welding current can flow moderately also through the pedestal 320, the high welding current can be produced through the weld parts 310a in the perpendicular direction, and the weld parts 310a can fully be heated locally.

Furthermore, when the pedestal 320 is composed to have the placing part 321 and the heat release part 322, the heat release effect can be increased more with heating the objects 310 being welded moderately, the cost can be reduced, and the reuse thereof can be also possible. For example, if the pedestal 320 is composed only of platinum and the size of the pedestal 320 is 10×10×10 mm, it costs about 40,000 yen or more. However, if it is composed of the placing part 321 composed of 10×10×1 mm platinum, and the heat release part 322 composed of 10×10×9 mm silver, it can cost 8000 yen or less.

In addition, when the tip form of the welding rods 330 is the half sphere form, the cone form, the trapezoid form obtained by flatly cutting the tip of the cone, the form combining the half sphere with the tip being cut flatly and the plane, or the multi pyramid form, the range in which the welding current flows can be reduced, and the weld parts 310a can be heated easily. Moreover, since the distance between the two weld parts 310a can be maintained constant with high accuracy, the welding conditions can be stabilized. Particularly, the half sphere form can provide the greater effects.

In addition, the embodiment gives a explanation of the case of welding the aluminum plate 311 and the nickel plate 312 as the objects 310 being welded, while the invention can be widely applied, to the welding of two or more objects being welded made of different materials. For example, the aluminum plate 311 can similarly be welded to a metal plate (clad plate) where a nickel plate and an iron plate are glued together, replacing the nickel plate 312. In this case, when it is the nickel plate portion in the metal plate and the aluminum plate 311 which are welded, the object being welded is the nickel plate, and the melting point of the objects being welded means the melting point of the aluminum plate and the nickel plate.

The method of manufacturing the weldment can be used for the method of manufacturing the following battery, for example.

Figure 24:
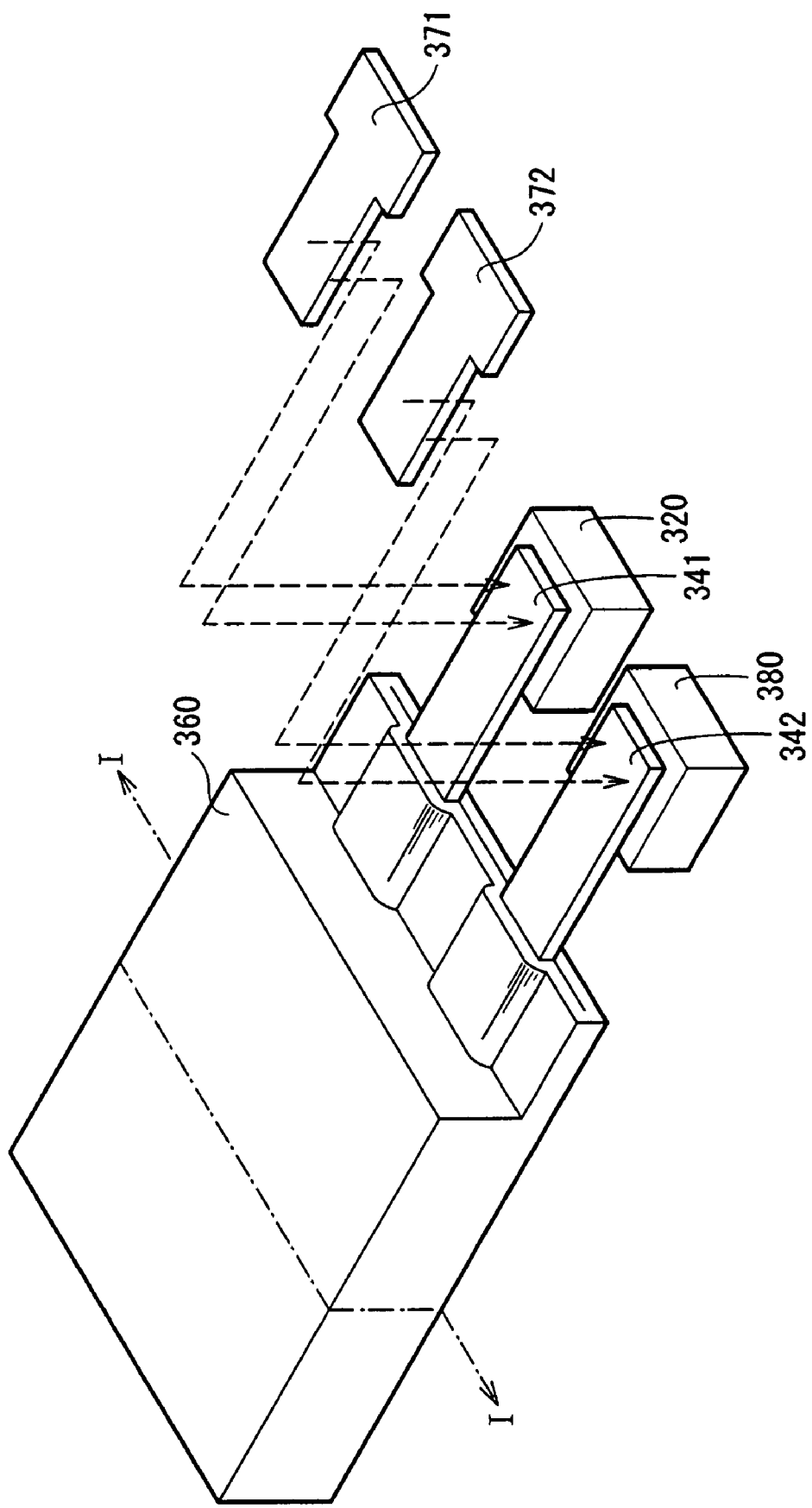
FIG. 24 is a perspective view showing a method of manufacturing a battery using the method of manufacturing the weldment shown in FIG. 20.
Figure 25:
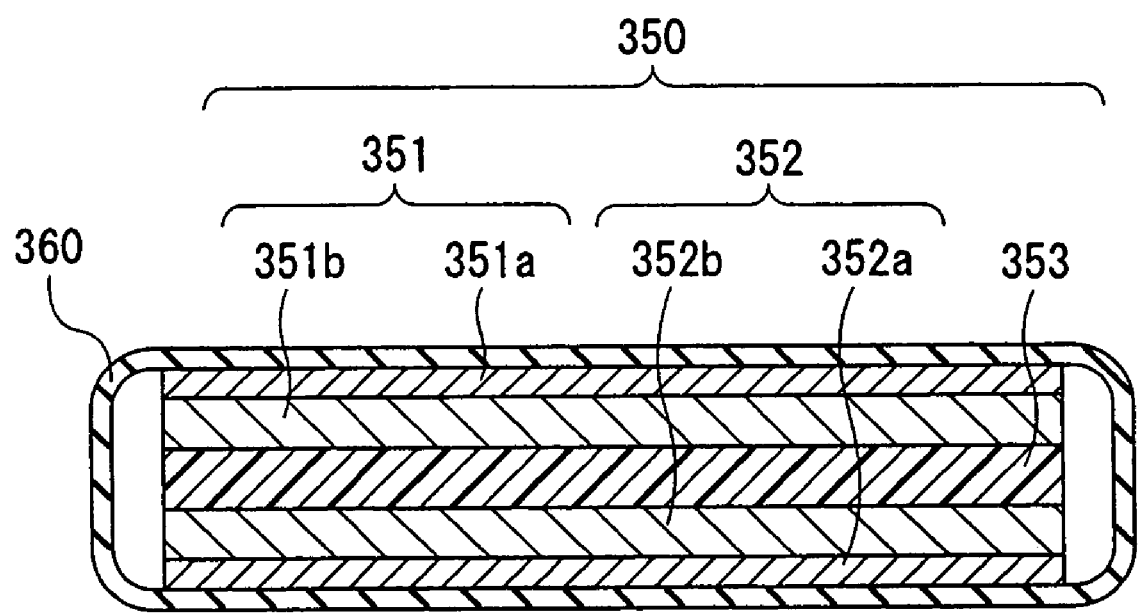
FIG. 25 is a sectional view of the battery taken along the line I-I shown in FIG. 24.

FIG. 24 shows a method of manufacturing a battery using the method of manufacturing the weldment according to the embodiment, and a structure of the battery manufactured by the method. FIG. 25 shows a sectional structure taken along the line I-I shown in FIG. 24. The battery has a form where a battery element 350 to which a positive electrode terminal strip 341 and a negative electrode terminal strip 342 are attached, is enclosed inside a coating member 360. The battery element 350 has elements in which a positive electrode 351 and a negative electrode 352 are laminated with a electrolyte 353 therebetween.

The positive electrode 351 is composed, for example, of a positive electrode current collector layer 351a and a positive electrode mixture layer 351b, and the positive electrode terminal strip 341 is connected to the positive electrode current collector layer 351a. The positive electrode current collector layer 351a is composed, for example, of aluminum foil, and the positive electrode mixture layer 351b is composed to contain, for example, a positive electrode material, a conductive agent such as carbon black or graphite, and a binding agent such as polyvinylidene fluoride. The positive electrode material preferably contains a lithium composite oxide or lithium composite sulfide containing lithium (Li), a lithium-free metal sulfide or oxide, a specific polymeric material, or the like, and any one kind or two kinds or more are chosen among them for the purpose of using the battery.

The negative electrode 352 is composed, for example, of a negative electrode current collector layer 352a and a negative electrode mixture layer 352b, and the negative electrode terminal strip 342 is connected to the negative electrode current collector layer 352a. The negative electrode current collector layer 352a is composed, for example, copper foil, and the negative electrode mixture layer 352b is composed to contain, for example, a negative electrode material and a binding agent such as polyvinylidene fluoride. The negative electrode material contains a material which can occlude and release lithium such as a carbon material, a silicon compound or a tin compound, or a material which can precipitate and dissolve lithium such as a lithium metal or a lithium alloy.

The electrolyte 353 is composed of the so-called gel type electrolyte or the so-called organic solid electrolyte, and contains, for example, a high molecular compound and, if needed, a plasticizer and a lithium salt as an electrolyte salt. Between the positive electrode 351 and the negative electrode 352, a separator which is not shown, may be located if needed.

The positive electrode terminal strip 341 is composed, for example, of a thin aluminum plate of the order of about 0.05 mm-0.15 mm in thickness. The negative electrode terminal strip 342 is composed, for example, of a thin nickel plate of the order of about 0.05 mm-0.15 mm in thickness. Wiring boards 371, and 372, composed of a thin nickel plate, for example, of the order of about 0.1 mm-0.2 mm in thickness, or a metal plate in which a nickel plate and an iron plate are glued together, are respectively welded to the positive electrode terminal strip 341 and the negative electrode terminal strip 342.

Such a battery can be manufactured as follows.

First, the battery element 350 is produced by the predetermined method, the positive electrode terminal strip 341 and the negative electrode terminal strip 342 are connected to the battery element 350, and the battery element 350 is enclosed inside the coating member 360. Subsequently, the wiring board 371 is welded to the positive electrode terminal strip 341 by the electric resistance according to the above method of manufacturing the weldment. That is, the positive electrode terminal strip 341 is directed to the pedestal 320 side, the positive electrode terminal strip 341 and the wiring board 371 are located on the pedestal 320 by using the pedestal 320 made of the refractory metal with a melting point higher than ones of the positive electrode terminal strip 341 and the wiring board 371, and the welding rods 330 are pressed to apply the voltage as shown in FIG. 20. Here, the positive electrode terminal strip 341 and the wiring board 371 are welded firmly, without the adhering of the positive electrode terminal strip 341 made of the aluminum plate to the pedestal 320, because the above method is used.

Then, the wiring board 372 is welded to the negative electrode terminal strip 342 by the electric resistance welding. Although the above method may be performed, the electric resistance welding may be performed by using the conventional pedestal 380, i.e., one composing of copper, a copper alloy, or a nonmetallic bake plate, because both the negative electrode terminal strip 342 and the wiring board 372 are composed of the nickel plate. Thereby, the battery shown in FIG. 24 is completed.

Figure 26:
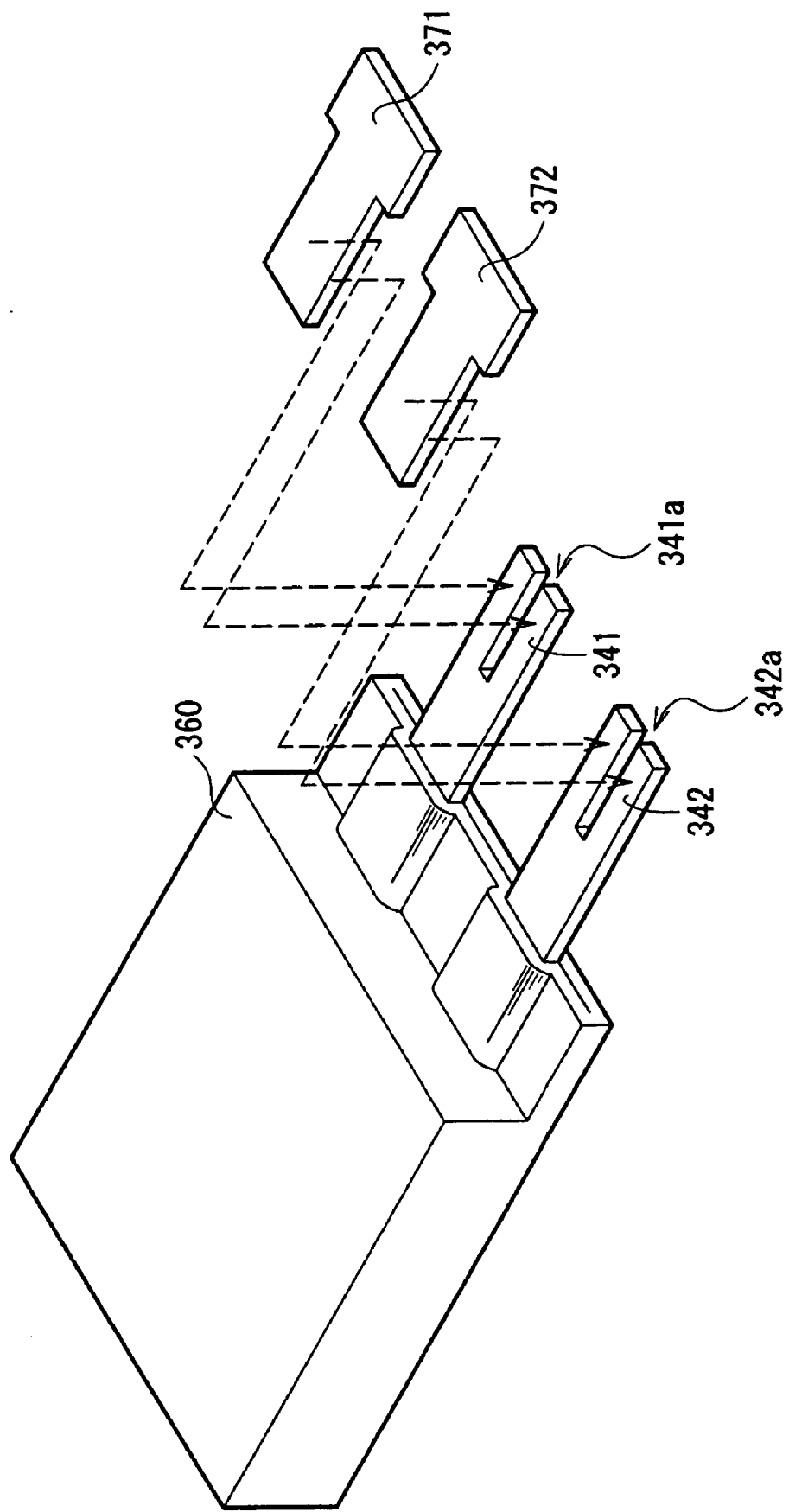
FIG. 26 is a perspective view showing a modification of the method of manufacturing the battery shown in FIG. 24.
Figure 27:
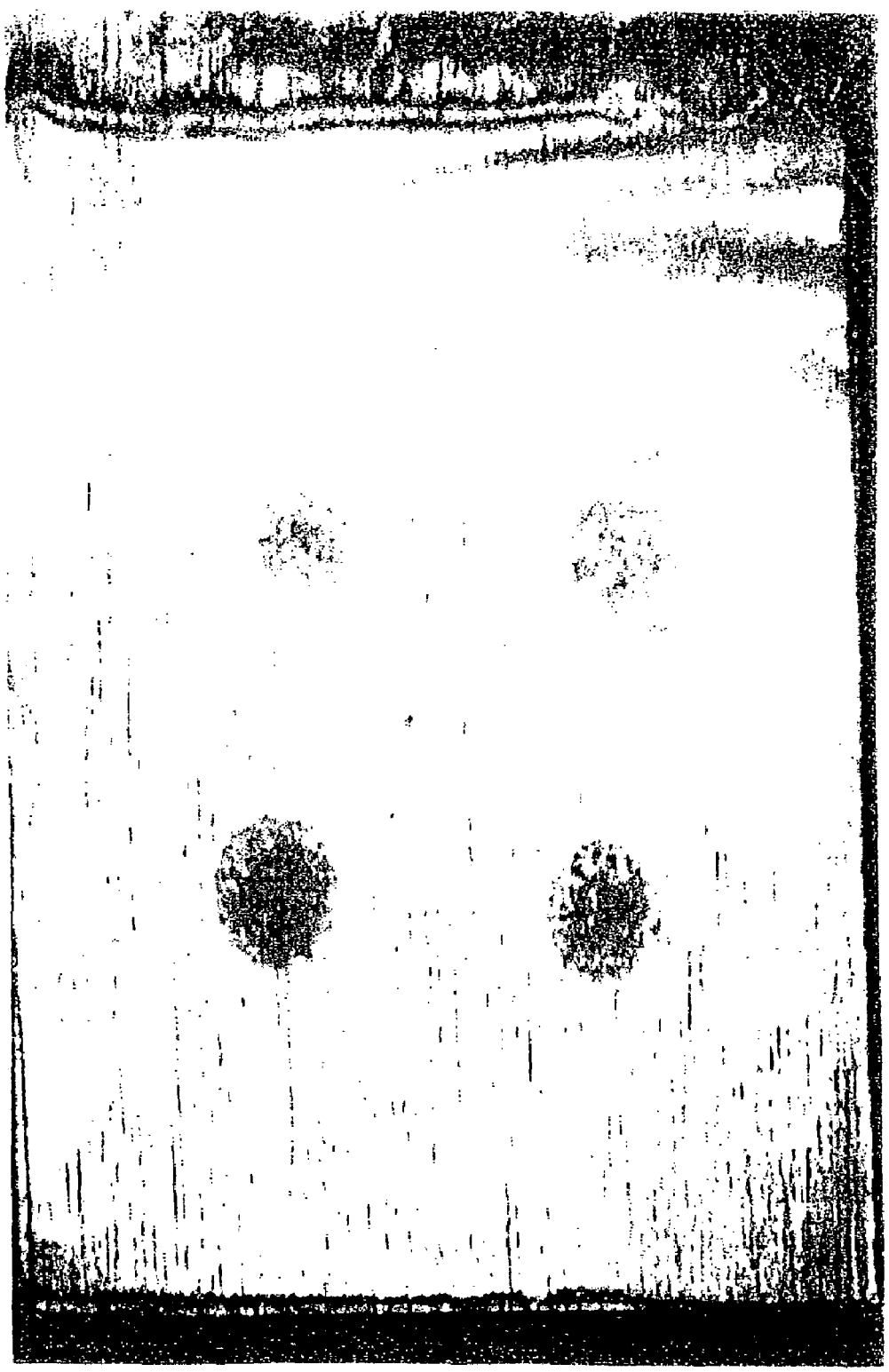
FIG. 27 is an optical microscope photograph showing weld marks of an aluminum plate according to Example 11 of the invention.
Figure 28:
FIG. 28 is an optical microscope photograph showing a state of a pedestal according to Example 11 of the invention.
Figure 29:
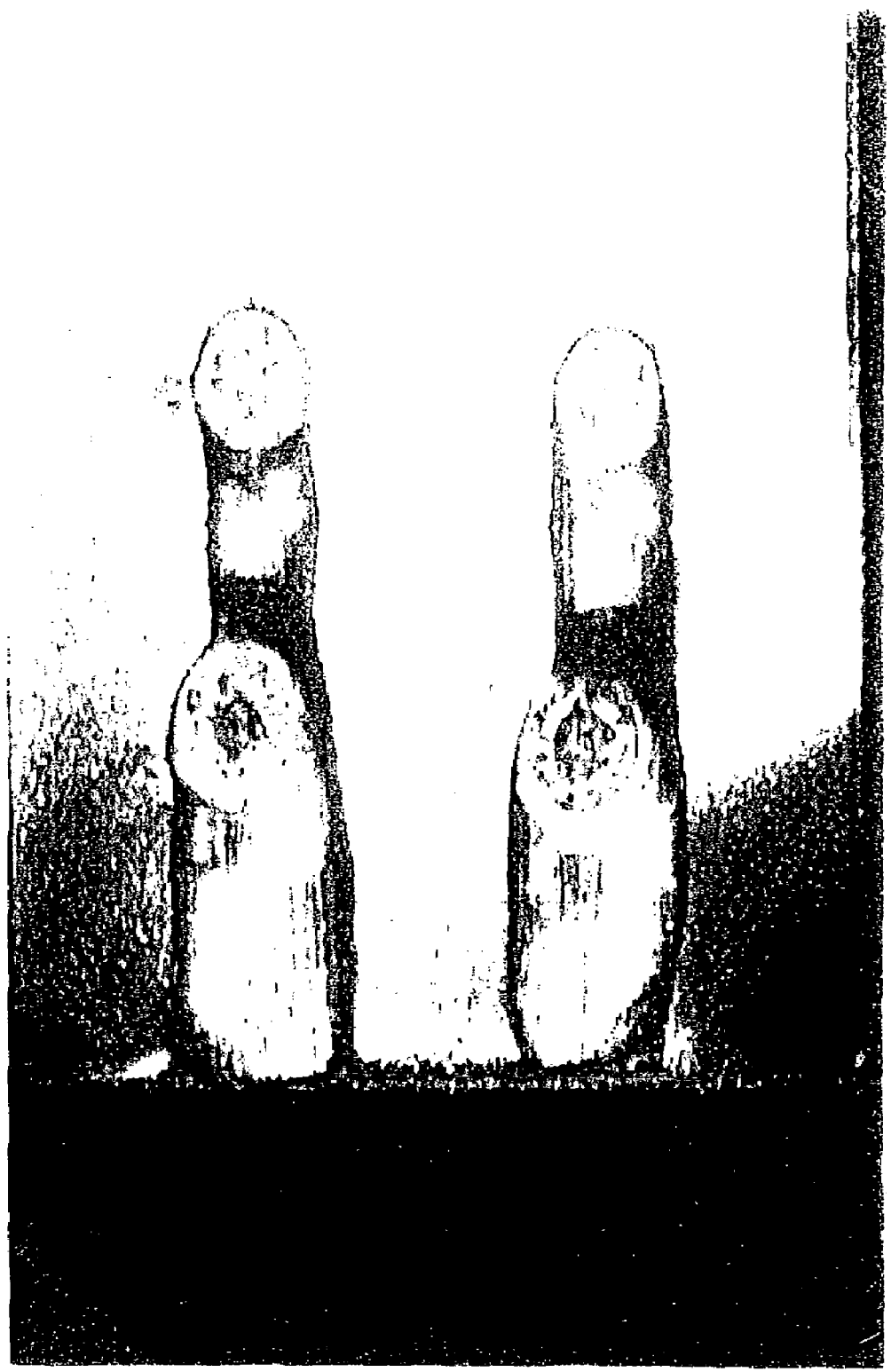
FIG. 29 is an optical microscope photograph showing a state after peeling according to Example 11 of the invention.
Figure 30:
FIG. 30 is an optical microscope photograph showing weld marks of an aluminum plate according to Example 12 of the invention.
Figure 31:
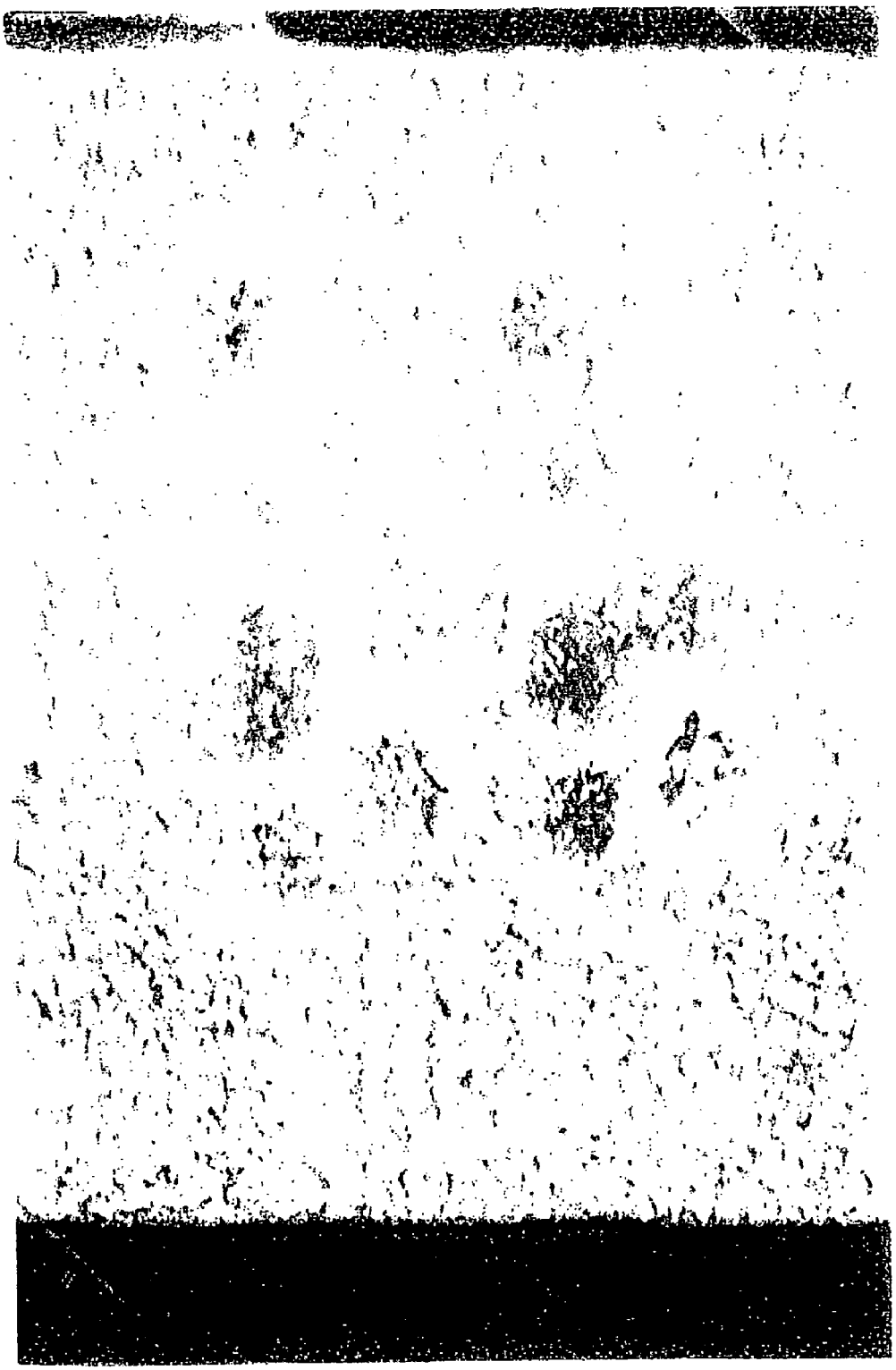
FIG. 31 is an optical microscope photograph showing a state of a pedestal according to Example 12 of the invention.
Figure 32:
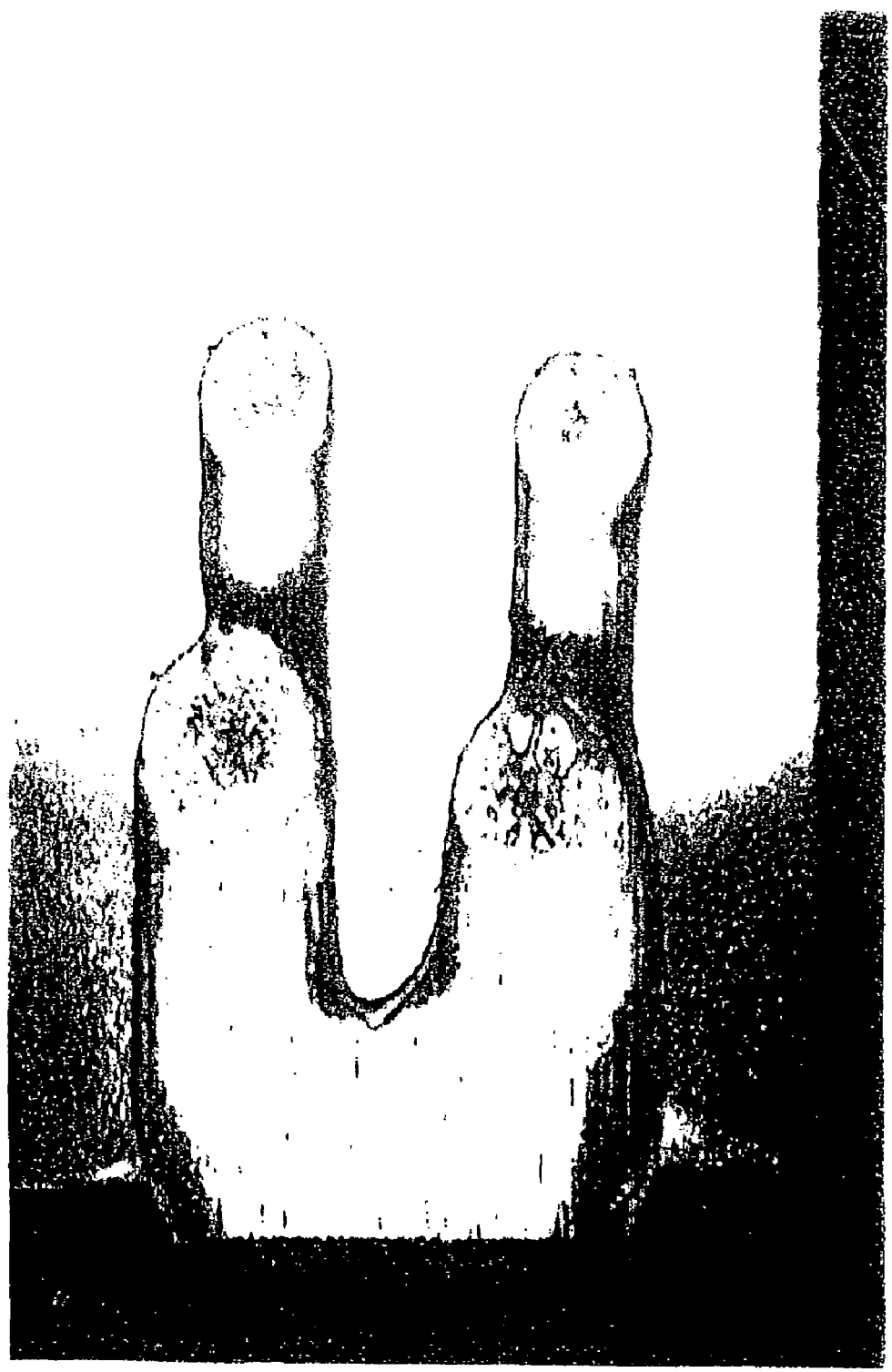
FIG. 32 is an optical microscope photograph showing a state after peeling according to Example 12 of the invention.

Moreover, when manufacturing a battery as shown in FIG. 26, the method of manufacturing the weldment according to the embodiment can be used. The battery has the same structure as the battery shown in FIG. 24 except for having grooves 341a and 342a in the tip portions of the positive electrode terminal strip 341 and the negative electrode terminal strip 342.

In such battery, since groove 341a is located in the tip portion of the positive electrode terminal strip 341, less welding current passes through the positive electrode terminal strip 341, and most of the welding current passes through the pedestal 320 or the wiring board 371. For this reason, the welding strength becomes higher.

In this connection, if the similar groove is located also in the wiring board 371 as well as the positive electrode terminal strip 341 and the negative electrode terminal strip 342, the temperature rise of the weld part of the wiring board 371 is prevented, and the excellent effects can seldom be expected, because no electric current flows through the welding rod 330 on the plus electrode→the wiring board 371→the welding rod 330 on the minus electrode. Therefore, it is more preferable not to locate a groove in the wiring boards 371, and 372.

Thus, according to the embodiment, the positive electrode terminal strip made of the thin aluminum plate, and the wiring board made of the nickel plate or the like can be firmly welded by the electric resistance welding. By the way, in the conventional ultrasonic welding, the range of the setting conditions for the high welding strength is very narrow, so it is very difficult to keep the welding strength high, and the rate of inferior goods can become high even when the form and the position relation of the attachments change slightly. On the other hand, according to the embodiment, the range of the setting conditions for the high welding strength is wide, so it is easy to keep welding strength high, and the rate of inferior goods can be reduced to a very low level. Moreover, since the electric resistance welding device is cheaper than the ultrasonic welding, the cost of equipment can also be reduced.

Furthermore, concrete examples of the invention will be described in detail with reference to FIG. 20.

EXAMPLES 1 and 2

As Example 1, the pedestal 320 was composed of platinum, the aluminum plate 311 and the nickel plate 312 as the objects 310 being welded were welded by the electric resistance welding as described in the above embodiment. Then, the direct current voltage was applied by the voltage apply control system, the maximum voltage was set to 1.2 V, the maximum current was set to 1000 A, and the voltage application time was set to 10 ms. As Example 2, the aluminum plate 311 and the nickel plate 312 was welded by the electric resistance welding like Example 1 except that the pedestal 320 was composed of iron.

And then, weld marks on the aluminum plate 311 side, and state of the placing surface 320a of the pedestal 320 were observed with an optical microscope. Moreover, the aluminum plate 311 and the nickel plate 312 which were welded were peeling, and state of the nickel plate 312 after the peeling were observed with the optical microscope. Those results are shown in FIGS. 27 to 32. FIG. 27, FIG. 28, FIG. 29, FIG. 30 FIG. 31, and FIG. 32 respectively show the weld marks of the aluminum plate 311 of Example 1, the state of the pedestal 320 of Example 1, the state after the peeling of Example 1, the weld marks of the aluminum plate 311 of Example 2, the state of the pedestal 320 of Example 2, the state after the peeling of Example 2.

Moreover, as Comparative Examples 1 and 2 for comparing with Examples, the aluminum plate and the nickel plate were welded by the electric resistance welding like Examples except that the pedestal was composed of copper (Comparative Example 1) or ceramic (Comparative Example 2). Also in Comparative Examples 1 and 2, the weld marks on the aluminum plate side, the state of the pedestal, and the state of the nickel plate 312 after the peeling were observed with the optical microscope as well as Examples. Those results are shown in FIGS. 33 to 38. FIG. 33, FIG. 34, FIG. 35, FIG. 36 FIG. 37, and FIG. 38 respectively show the weld marks of the aluminum plate 311 of Comparative Example 1, the state of the pedestal 320 of Comparative Example 1, the state after the peeling of Comparative Example 1, the weld marks of the aluminum plate 311 of Comparative Example 2, the state of the pedestal 320 of Comparative Example 2, the state after the peeling of Comparative Example 2.

As shown in FIGS. 27 to 32, according to Examples, little weld between the pedestal 320 and the aluminum plate 311, little adhesion of aluminum to the pedestal 320 were found, and the states of the weld parts 310a were excellent. Furthermore, as shown in FIGS. 29 to 32, the states after the peeling have also revealed that the aluminum of the weld parts 310a was adhered to the nickel plate 312, which has confirmed the strong weld therebetween. Moreover, it was revealed that Example 2 with the pedestal 320 composed of iron had an area of the weld parts 310a somewhat larger than that of Example 1 with one composed of platinum, and a little adhesion of aluminum was found on the pedestal 320. The reason given is that the temperature of the weld parts 310a became higher owing to the lower thermal conductivity of iron compared to platinum, and the area of the weld parts 310a became larger. Another reason given is that a small portion on the iron surface dissolved owing to the melting point of iron lower than that of platinum.

Figure 33:
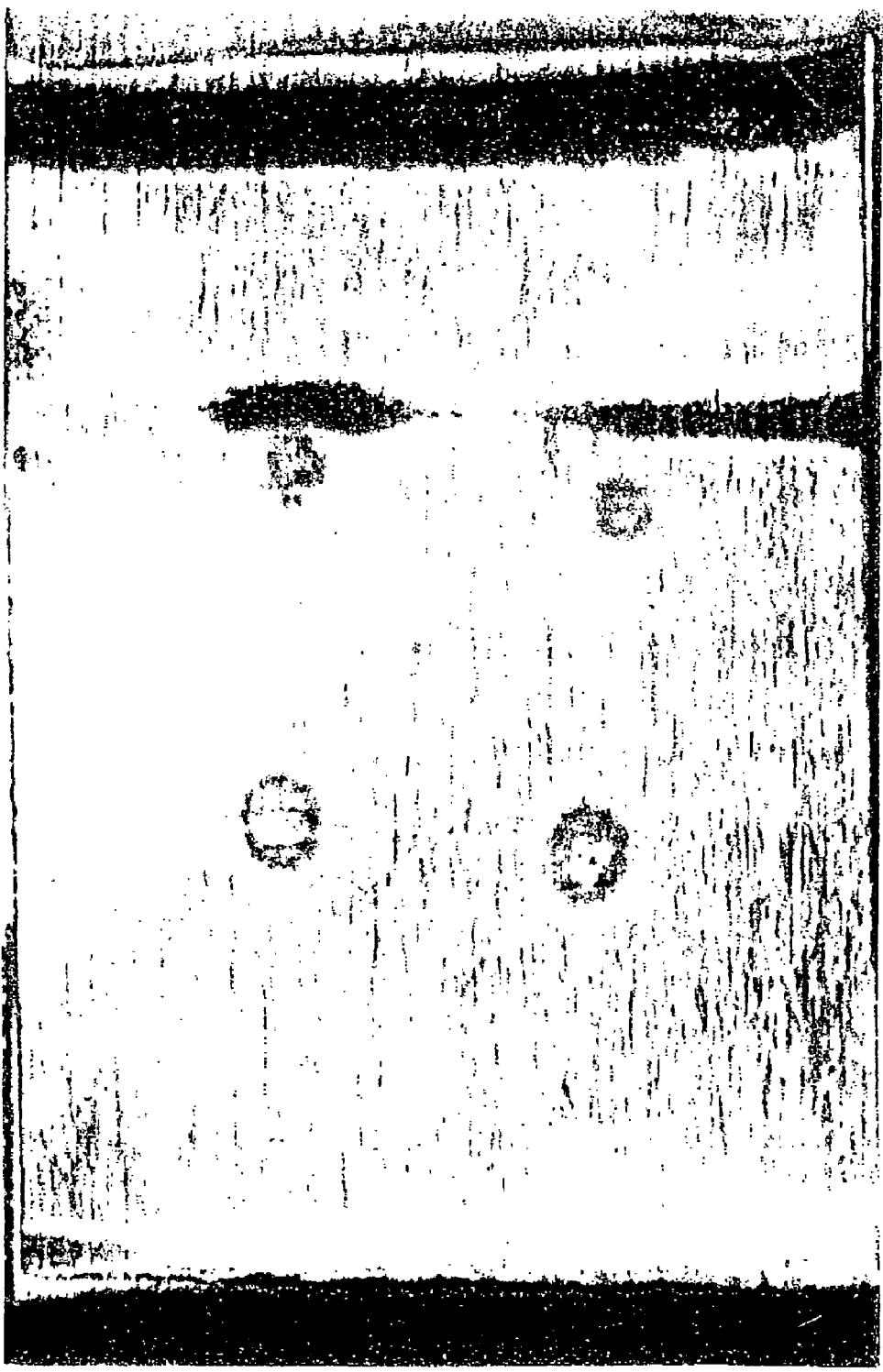
FIG. 33 is an optical microscope photograph showing weld marks of an aluminum plate according to Comparative Example 11.
Figure 34:
FIG. 34 is an optical microscope photograph showing a state of a pedestal according to Comparative Example 11.
Figure 35:
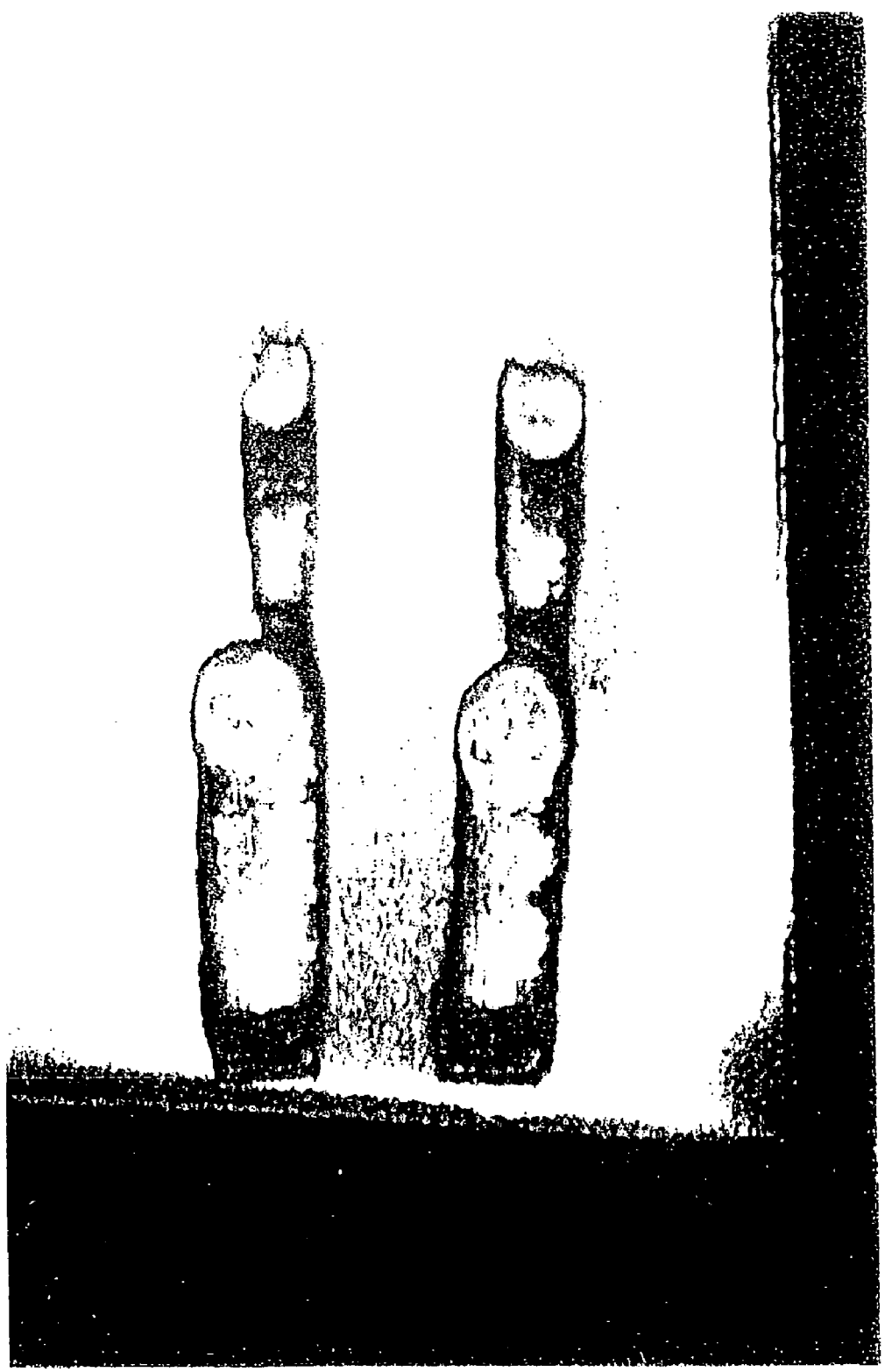
FIG. 35 is an optical microscope photograph showing a state after peeling according to Comparative Example 11.

On the other hand, as shown in FIGS. 33 to 35, in Comparative Example 1 having the pedestal composed of copper, the area of the weld parts 310a was small, the welding strength was low, and large amount of the aluminum adhesion was found on the pedestal. The reasons given are that it was not possible to fully heat the aluminum plate 311 and the nickel plate 312 due to the high thermal conductivity of copper, and a part of the pedestal was dissolved with the aluminum plate 311 due to the low melting point. Here, it is thought that a higher setting voltage in the welding allow the objects 310 being welded to be heated fully and welded firmly; however the aluminum plate 311 adheres to the pedestal 320 and a hole opens in the aluminum plate 311, so it is not preferable.

Figure 36:
FIG. 36 is an optical microscope photograph showing weld marks of an aluminum plate according to Comparative Example 12.
Figure 37:
FIG. 37 is an optical microscope photograph showing a state of a pedestal according to Comparative Example 12.
Figure 38:
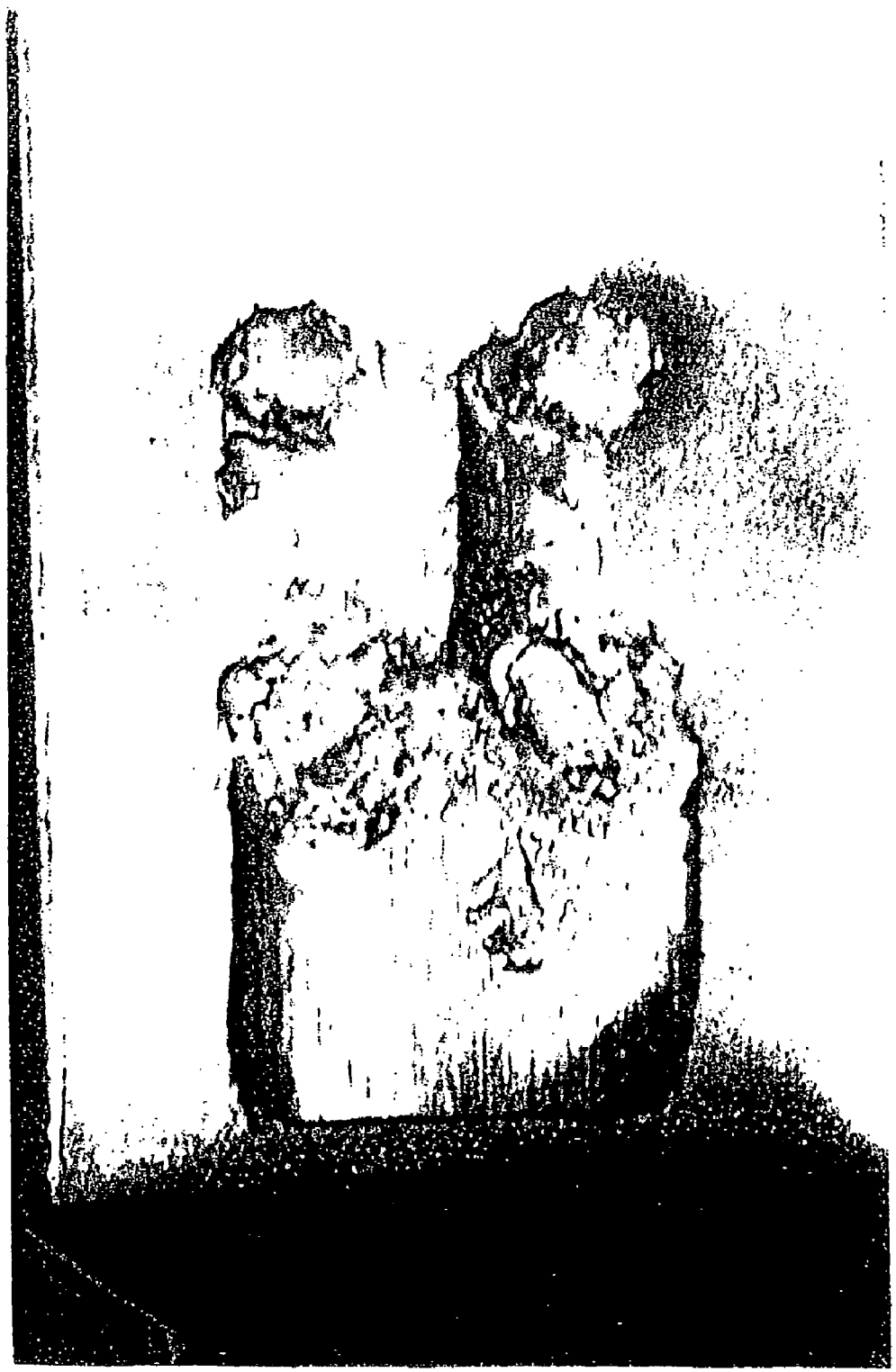
FIG. 38 is an optical microscope photograph showing a state after peeling according to Comparative Example 12.

Moreover, as shown in FIGS. 36 to 38, in Comparative Example 2 having the pedestal composed of ceramic, holes opened in the aluminum plate 311, the welding strength was inadequate and a part of aluminum was adhered to the pedestal. The reasons given are that most of the welding current flowed through the aluminum plate 311 and the nickel plate 312 due to no welding current flow through the pedestal and the temperature of the weld parts of the aluminum plate and the nickel plate did not increase, and further the aluminum plate dissolved in excess and boiled due to the low thermal conductivity of the pedestal, in the case of an insulator such as ceramic.

That is, it has been found that the two or more objects 310 being welded made of the different material can firmly be welded by the electric resistance welding, when the pedestal 320 is composed of the refractory metal of which the melting point is higher than those of the objects 310 being welded, and the thermal conductivity at 700° C. is 10 W/mK or more, and the electric volume resistivity at 100° C. is below 30 μΩ cm.

In addition, in the above Examples, the cases where the pedestal 320 is composed of platinum or iron and the aluminum plate 311 and the nickel plate 312 are welded, have described by means of the concrete examples, while the pedestal 320 being composed of other material described in the above embodiments can also obtain the same results as the above Examples. Moreover, as described in the above embodiments, the same results as the above examples can be obtained also when the electric resistance welding is performed on the two or more objects 310 being welded which is composed of another different material.

Although the invention has been described by the foregoing embodiment and examples, the invention is not limited to the embodiment and the examples but can be variously modified. For example, the structure of the battery have been described by means of the concrete examples in the above embodiments, while the invention is applicable similarly to batteries having other structures. For example, the battery using lithium as reacting species for the electrode has been described concretely in the above embodiments, while it is applicable similarly to batteries using another reacting species for the electrode. Moreover, the cases where the electrolyte is composed of the gel-type electrolyte or the organic solid electrolyte have been described in the above embodiment, while it may be composed of an electrolytic solution which is a liquid electrolyte, or an inorganic electrolyte made of an inorganic material. Furthermore, any form of the battery can be applicable.

Moreover, the case where the method of manufacturing the weldment of the invention is used for manufacturing the battery, has been described in Seventh embodiment, while it can similarly be applied to manufacturing other things. Especially, the invention is effective when welding thin objects being welded with a different melting point.

As described above, according to the battery or the method of manufacturing the same of the invention, the electrode made of the metal material with the comparatively low melting point like aluminum or the aluminum base alloy is sandwiched between the metal plates with the melting point higher than that of the electrode, and the welding is performed by raising the welding temperature to the high temperature at which the surfaces of the metal plates facing the electrode can be fused to form an alloy together with the surfaces of the electrode by means of the electric resistance welding or another welding process, which produces the effects of being able to eliminate the problems of the poor welding occurrence in the step of welding the electrode and the metal plate, and embody the secondary battery in which the electrode and the metal plate are certainly mechanically and electrically welded. As a result, the production yield rate can be improved and it is also possible to accomplish the further reduction in the manufacturing cost, or the like. Moreover, the durability and the reliability of the secondary battery can be increased by mechanically and electrically ensuring the welding of the electrode and the metal plate without the poor welding. Moreover, the metal plates are welded to both the upper and lower sides of one plate of the electrode, so the mechanical strength is higher and the area of the electric connection is larger than the conventional case where the metal plate is welded only to either of the upper and lower sides of the electrode, and eventually, the durability and the reliability of the secondary battery can be increased.

Especially, according to the battery and the method of manufacturing the same of one aspect of the invention, furthermore, the metal plate is formed by bending the single piece of plate into a roughly horseshoe shape, and the electrode is sandwiched between the two boards of the horseshoe shape, and therefore, the step of positioning and fixing individually the metal plates respectively to the upper and lower sides of the electrode in the electric resistance welding, is not required. Eventually, there are the effects of ensuring the welding of the electrode and the metal plates, and accomplishing the further simplification of the secondary battery structure or the manufacturing method comprising the welding step.

Moreover, according to the method of manufacturing the weldment of the invention, the placing surface of the pedestal is composed of the refractory metal with the melting point higher than those of the objects being welded, or according to the pedestal of the invention, the placing surface is composed of the metal with the melting point higher than 1455° C., and the placing surface of the pedestal is composed of the refractory metal with the melting point higher than the electrode terminal strip and the wiring board. Thus, also when the objects being welded made of a different material are welded by the electric resistance welding, the adhesion of the objects being welded to the pedestal can be prevented, the excessive dissolution of the objects being welded can be prevented, and the high welding current can be produced through the weld part. Therefore, the objects being welded can be welded firmly by the electric resistance welding. Moreover, the setting range of the electric welding control device is wide, so the welding strength can be stabilized also when welding in large quantities.

Especially, according to the method of manufacturing the weldment or the pedestal of one aspect of the invention, the placing surface of the pedestal is composed of the metal with 10 W/mK or more of the thermal conductivity at 700° C., so the objects being welded can be heated moderately and the excessive dissolution can be prevented effectively. Moreover, the placing surface of the pedestal is composed of the metal with 30 μΩ cm or less of the electric volume resistivity at 100° C., so the welding current can be moderately passed also through the pedestal, and the high welding current can be produced through in the perpendicular direction of the weld part.

Moreover, according to the method of manufacturing the weldment or the pedestal of another aspect of the invention, the pedestal has the placing part and the heat release part with the thermal conductivity higher than that of the placing part, so the heat release effect can be increased with heating the objects being welded moderately, the manufacturing costs can be cheap, the reuse thereof is also possible, and the technique is very worthy industrially.

Obviously many modifications and variations of the present invention are possible in the light of the above description. It is therefore to be understood that within the scope of the appended claims the invention may be practiced otherwise than as specifically described.

TABLE 1

| Chemical Symbol of Metal | Melting Point (° C.) | Thermal Conductivity at 700° C. (W/mk) | Electric Volume Resistivity at 100° C. (μΩ · cm) |
| --- | --- | --- | --- |
| Pt | 1772 | 78 | 13.6 |
| Fe | 1537 | 34 | 14.7 |
| Cr | 1857 | about 66 | 16.1 |
| Zr | 1852 | about 23 | 58 |
| Ti | 1675 | about 20 | — |
| Mo | 2610 | 113 | 7.6 |
| Pd | 1554 | 93 | 13.8 |
| Ir | 2454 | about 126 | 6.8 |
| W | 3407 | 119 | 7.3 |

TABLE 2

| | Thermal Conductivity at 100° C. (W/mk) |
| --- | --- |
| Ag | 422 |
| Cu | 395 |
| Al | 240 |
| Au | 313 |

The invention claimed is:

1. A method of manufacturing a weldment, the method comprising:
   providing a pedestal to support two or more objects being welded, the pedestal having a plurality of layers stacked on top of each other, the plurality of layers including (a) a support layer having an upper support surface and made of a refractory metal with a melting point higher than melting points of the two or more objects being welded, (b) a heat release layer with thermal conductivity higher than that of the support layer, and (c) an adherence layer spacing the support layer from the heat release layer;
   providing a lithium-ion secondary battery cell having an aluminum-laminate film coating and a solid polymer electrolyte, the secondary battery cell capable of charging and discharging electricity;
   connecting a plate electrode to the secondary battery cell to conduct electricity during charging and discharging; and
   welding metal plates to the electrode by performing electric resistance welding by pressing a welding rod, the metal plates having a melting point higher than that of the electrode or which are thicker than the electrode and have the same melting point,
   wherein,
      the electrode is made of aluminum or an aluminum base alloy, and the metal plates are made of nickel or a nickel base alloy, and
      at least one of the metal plates is welded to each of an upper and lower side of the electrode, and one end of at least one of the metal plates is welded to the electrode and the other end thereof is formed in a shape having an external connection terminal.

2. The method of manufacturing a weldment according to claim 1, wherein the support surface of the pedestal is composed of a metal having thermal conductivity at 700° C. of 10 W/mK or more, or electric volume resistivity at 100° C. of 30 μΩ cm or less.

3. The method of manufacturing a weldment according to claim 1, further comprising:
   directing the electrode to a side of the pedestal and overlapping the objects being welded.

4. The method of manufacturing a weldment according to claim 1, wherein at least the support surface of the pedestal is composed of at least one kind of metal selected from the group consisting of platinum, iron, chromium, zirconium, titanium, molybdenum, palladium, tungsten, and iridium.

5. The method of manufacturing a weldment according to claim 1, wherein the support layer is composed of at least one kind of metal selected from the group consisting of platinum, iron, chromium, zirconium, titanium, molybdenum, palladium, tungsten, and iridium, and the heat release layer is composed of at least one kind of metal selected from the group consisting of silver, copper, aluminum and gold.

6. The method of manufacturing a weldment according to claim 1, wherein the support layer and the heat release layer are mechanically joined.

7. The method of manufacturing a weldment according to claim 1, wherein a tip form of the welding rod is a half sphere form.

8. The method of manufacturing a weldment according to claim 1, wherein a direct current voltage or an alternating voltage is applied to the welding rod by a voltage apply control system or an electric current apply control system, a maximum voltage is not less than 0.5 V nor more than 5 V, a maximum current is not less than 100 A nor more than 3000 A, and a voltage application time is not less than 5 ms nor more than 40 ms.

9. The method of manufacturing a weldment according to claim 1, wherein the adherence layer is made of a silicon adhesive or a silicon oil.

10. A pedestal to support an object during welding of the object, the pedestal comprising:
- a support layer with a support surface thereon, the support layer composed of a metal with a melting point higher than 1455° C.;
- a heat release layer spaced from the support layer by an adherence layer, the heat release layer having thermal conductivity higher than that of the support layer
- a plate electrode connectable to a secondary battery cell and that conducts electricity during charging and discharging of electricity of the secondary battery; and
- a metal plate which (a) has a melting point higher than that of the electrode or (b) is thicker than the electrode and has the same melting point,
- wherein the adherence layer bonds the support layer and the heat release layer and is made of a silicon adhesive or a silicon oil.

11. The pedestal according to claim 10, wherein the support surface is composed of a metal with thermal conductivity at 700° C. of 10 W/mK or more, or electric volume resistivity at 100° C. of 30 $\mu\Omega$ cm or less.

12. The pedestal according to claim 10, wherein the support surface is composed of at least one kind of metal selected from the group consisting of platinum, iron, chromium, zirconium, titanium, molybdenum, palladium, tungsten, and iridium.

13. The pedestal according to claim 10, wherein the support layer is composed of at least one kind of metal selected from the group consisting of platinum, iron, chromium, zirconium, titanium, molybdenum, palladium, tungsten, and iridium, and the heat release layer is composed of at least one kind of metal selected from the group consisting of silver, copper, aluminum, and gold.

14. The pedestal according to claim 10, wherein the support layer, adherence layer, and heat release layer are stacked on top of each other.

15. The pedestal according to claim 10, wherein the adherence layer entirely separates the support layer from the heat release layer.

* * * * *